(12) United States Patent
Zou et al.

(10) Patent No.: US 12,408,737 B2
(45) Date of Patent: Sep. 9, 2025

(54) LOCKING STRUCTURE, HOUSING ASSEMBLY, AND ELECTRONIC DEVICE

(71) Applicant: GUANGDONG OPPO MOBILE TELECOMMUNICATIONS CORP., LTD., Guangdong (CN)

(72) Inventors: Xifan Zou, Guangdong (CN); Fuping Fang, Guangdong (CN); Jingzhuo Geng, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 285 days.

(21) Appl. No.: 18/344,287

(22) Filed: Jun. 29, 2023

(65) Prior Publication Data

US 2023/0337789 A1    Oct. 26, 2023

Related U.S. Application Data

(63) Continuation of application No. PCT/CN2021/136621, filed on Dec. 9, 2021.

(30) Foreign Application Priority Data

Jan. 19, 2021   (CN) .......................... 202110069698.2
Jan. 19, 2021   (CN) .......................... 202120140667.7
Jan. 19, 2021   (CN) .......................... 202120141448.0

(51) Int. Cl.
*A44C 5/14*      (2006.01)
*H04B 1/3888*    (2015.01)
*H04B 1/38*      (2015.01)

(52) U.S. Cl.
CPC ........... *A44C 5/147* (2013.01); *H04B 1/3888* (2013.01)

(58) Field of Classification Search
CPC ....... A44C 5/147; H04B 1/3888; G04B 37/18
See application file for complete search history.

(56) References Cited

U.S. PATENT DOCUMENTS 11,357,293 B2 *   6/2022   Hu ....................... A44C 5/0007
2015/0277489 A1  10/2015   Lin
(Continued)

FOREIGN PATENT DOCUMENTS

CN    207301494      5/2018
CN    207870446      9/2018
(Continued)

OTHER PUBLICATIONS

CNIPA, Office Action issued for CN Application No. 202110069698.2, Aug. 30, 2024.
(Continued)

*Primary Examiner* — David M Upchurch
(74) *Attorney, Agent, or Firm* — Hodgson Russ LLP

(57) ABSTRACT

Provided are a locking structure, a housing assembly, and an electronic device. The locking structure includes first and second structural bodies, a pressing member, and a clamped member. The first structural body is provided with first and second mounting portions. The second structural body includes a locking portion. The pressing member is movably provided at the first mounting portion. The clamped member is movably provided at the second mounting portion, and can be engaged with the locking portion. In mounting the second structural body to the first structural body, the clamped member is driven by the locking portion to move, and is restored so as to be engaged with the locking portion. In detaching the second structural body from the first structural body, the pressing member is pressed by an external force to drive the clamped member to move so as to be disengaged from the locking portion.

20 Claims, 16 Drawing Sheets

(56) References Cited

U.S. PATENT DOCUMENTS

| | | | | |
|---|---|---|---|---|
| 2016/0037877 A1* | 2/2016 | Perkins | ................. | A44C 5/147 |
| | | | | 224/164 |
| 2020/0268113 A1 | 8/2020 | Cao | | |
| 2020/0390202 A1* | 12/2020 | Xue | ................. | G04B 37/1486 |
| 2020/0405016 A1* | 12/2020 | Pesenti | ................. | A44C 5/147 |

FOREIGN PATENT DOCUMENTS

| | | |
|---|---|---|
| CN | 105376970 | 1/2019 |
| CN | 109924618 | 6/2019 |
| CN | 110558686 | 12/2019 |
| CN | 209769231 | 12/2019 |
| CN | 211407844 | 9/2020 |
| CN | 211407845 | 9/2020 |
| CN | 211608393 | 10/2020 |

OTHER PUBLICATIONS

Huang Ling, "Research and Discussion on the Connection Structure of Watch Case Band," Science, Technology and Innovation, 2019 No. 16, Aug. 25, 2019 (Aug. 25, 2019).

CNIPA, Notification to Grant Patent Right for Invention for CN Application No. 202120141448.0, Jun. 29, 2021.

CNIPA, Notification to Grant Patent Right for Invention for CN Application No. 202120140667.7, Jul. 16, 2021.

WIPO, International Search Report and Written Opinion for PCT/CN2021/136621, Mar. 9, 2022.

* cited by examiner

LOCKING STRUCTURE, HOUSING ASSEMBLY, AND ELECTRONIC DEVICE

CROSS-REFERENCE OF RELATED APPLICATIONS

This application is a continuation of International Application No. PCT/CN2021/136621, filed Dec. 9, 2021, which claims priority to: Chinese Patent Application No. 202120141448.0, filed Jan. 19, 2021; Chinese Patent Application No. 202110069698.2, filed Jan. 19, 2021; and Chinese Patent Application No. 202120140667.7, filed Jan. 19, 2021. The entire disclosures of the aforementioned applications are incorporated herein by reference.

TECHNICAL FIELD

The present disclosure relates to the field of wearable devices, and in particular to a locking structure, a housing assembly and an electronic device.

BACKGROUND

Smart wearable devices are capable of being worn on the body, and they may detect a health condition at any time, perform instant messaging, and offer other functions. In recent years, more and more people have begun to pay attention to and use the smart wearable devices. A traditional smart watch includes a watch body and a watch strap connected to the watch body, and the watch strap may be wound around and fixed on the wrist of the user.

The traditional watch strap is connected to the watch body by means of mating between a slot and a spring bar. The watch strap may be connected stably with the watch body, after two ends of the spring bar are inserted into the slot. However, due to the small and special structure of the spring bar, if one desires to detach the spring bar from the slot or install the spring bar into the slot, it is necessary to use a special tool such as a spring-bar needle for the detachment and installation, which is inconvenient to operate.

SUMMARY

Embodiments of the present disclosure provide a locking structure, a housing assembly and an electronic device.

In a first aspect, an embodiment of the disclosure provides a locking structure. The locking structure includes a first structural body, a second structural body, a pressing member and a clamped member. The first structural body is provide with a first mounting portion and a second mounting portion, and the second structural body includes a main body and a locking portion protruding relative to the main body. The pressing member is movably provided at the first mounting portion, and is configured to move relative to the first mounting portion under an external force. The clamped member is movably provided at the second mounting portion and is positioned at the first structural body through the second mounting portion, and the clamped member is configured to be engaged with the locking portion. At least partial structure of the clamped member is arranged opposite to the pressing member. In a process of mounting the second structural body to the first structural body, the clamped member is driven by the locking portion to move relative to the second mounting portion, and is restored so as to be engaged with the locking portion. In a process of detaching the second structural body from the first structural body, the pressing member is capable of being pressed to drive the clamped member to move so as to enable the clamped member to be disengaged from the locking portion.

In a second aspect, an embodiment of the present disclosure further provides a housing assembly. The housing assembly includes a middle frame, a housing, and a key. The housing is provided with a first mounting portion, and the middle frame is provided with a second mounting portion. The key is connected to the middle frame and is configured to connect the middle frame and an external structure including a locking portion. The key includes a pressing member and a clamped member. The pressing member is movably provided at the first mounting portion, and is configured to move relative to the first mounting portion in a first direction under an external force. The clamped member is movably provided at the second mounting portion and is positioned at the middle frame through the second mounting portion, and the clamped member is configured to be engaged with the locking portion of the external structure. At least partial structure of the clamped member is arranged opposite to the pressing member. In a process of mounting the external structure to the middle frame, the external structure is adapted to move in a second direction to push the clamped member to move relative to the middle frame in the first direction, and the clamped member is capable of being restored so as to be engaged with the locking portion of the external structure. In a process of disengaging the external structure from the middle frame, the pressing member is capable of being pressed to drive the clamped member to move in the first direction so as to be disengaged from the external structure, where the first direction is different from the second direction.

In a third aspect, an embodiment of the present disclosure provides an electronic device. The electronic device includes a casing, a key, and a clamped member. The casing is provided with a first mounting portion and a second mounting portion communicated with each other. The key includes a pressing member and an elastic connection member, the elastic connection member is connected to the pressing member, and the pressing member is provided at the first mounting portion. The clamped member is provided at the second mounting portion, and the assembling and positioning of the clamped member to the casing are performed separately from the assembling and positioning of the pressing member to the casing. The clamped member is adapted to mate with a locking portion of the strap, to make the strap confined at the casing. When the strap is confined at the casing, the elastic connection member abuts against the casing, to make the pressing member confined at the casing. The pressing member is adapted to, when being pressed, move relative to the casing, and drive the clamped member to move, to enable the clamped member to be disengaged from the strap, and enable the strap to be detached from the casing.

Other features and aspects of the disclosed features will become apparent from the following detailed description, taken in conjunction with the accompanying drawings, which illustrate, by way of example, the features in accordance with embodiments of the disclosure. The summary is not intended to limit the scope of any embodiments described herein.

BRIEF DESCRIPTION OF THE DRAWINGS

In order to more clearly explain technical solutions of embodiments of the present disclosure, drawings used in the embodiments will be briefly introduced below. Obviously, the drawings as described below are merely some embodi

DETAILED DESCRIPTION OF PREFERRED EMBODIMENTS

Figure 1:
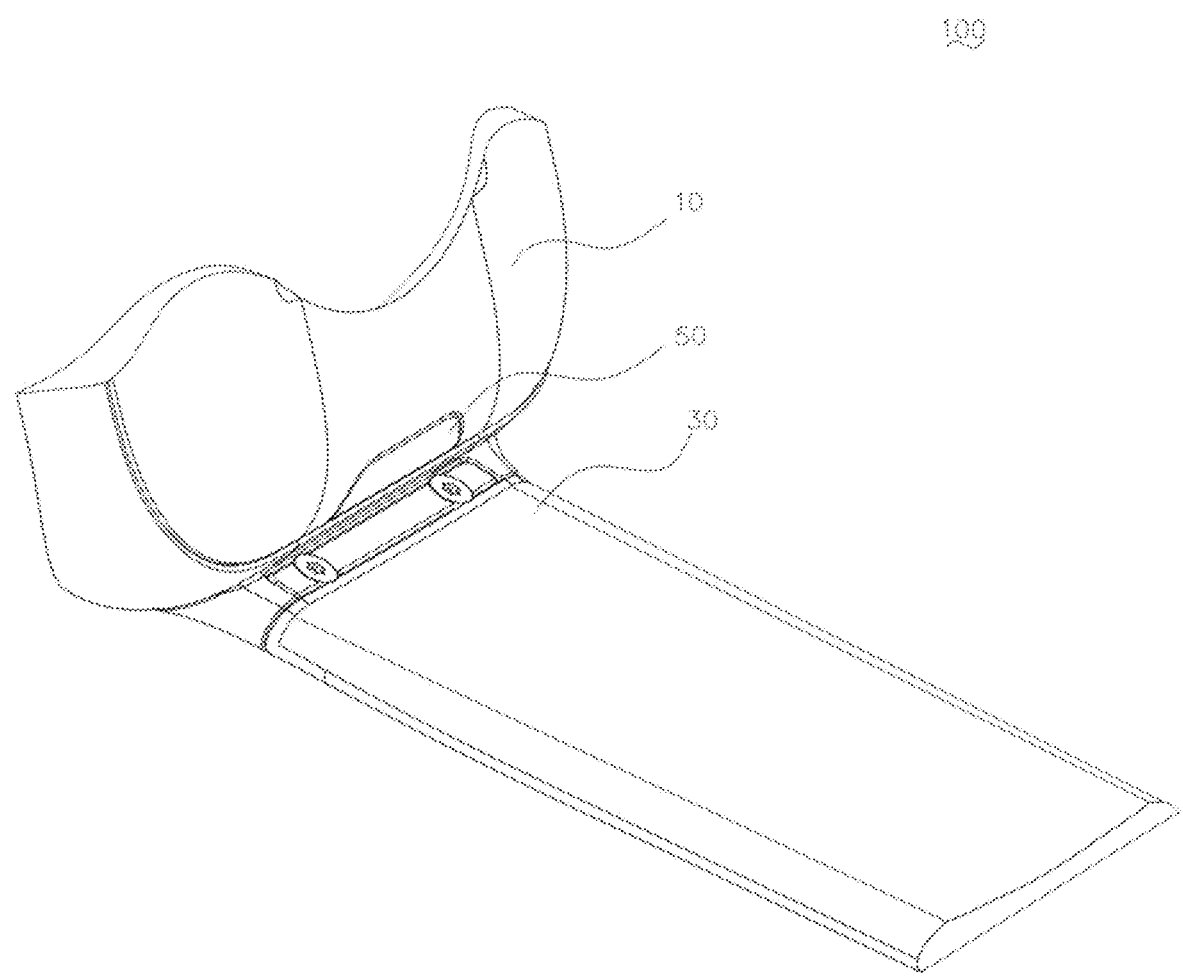
- FIG. 1 is a partial perspective view illustrating a locking structure according to an embodiment of the present disclosure.

The technical solutions in the embodiments of the present disclosure will be clearly and comprehensively described below with reference to the accompanying drawings in the embodiments of the present disclosure. Apparently, the described embodiments are only some of the embodiments of the present disclosure, but not all of the embodiments. All other embodiments, obtained by those skilled in the art without inventive work based on the embodiments in the present disclosure, fall within the protection scope of the present disclosure.

A traditional smart watch includes a watch body and a watch strap connected to the watch body, and the watch strap may be wound around and fixed on the wrist of the user. The traditional watch strap is connected to the watch body by means of mating between a slot and a spring bar. The watch strap may be connected stably with the watch body, after two ends of the spring bar are inserted into the slot. However, due to the small and special structure of the spring bar, if one desires to detach the spring bar from the slot or install the spring bar into the slot, it is necessary to use a special tool such as a spring-bar needle for the detachment and installation, which is inconvenient to operate.

In order to solve the above problem, the embodiments of the present disclosure provide a locking structure, a smart wearable device, and a housing assembly. The locking structure includes a first structural body, a second structural body, a pressing member and a clamped member. The first structural body is provided with a first mounting portion and a second mounting portion. The second structural body includes a main body and a locking portion protruding relative to the main body. The pressing member is movably provided at the first mounting portion, and configured to move relative to the first mounting portion under an external force. The clamped member is movably provided at the second mounting portion, and is positioned at the first structural body through the second mounting portion. The clamped member is configured to be engaged with a locking portion. At least partial structure of the clamped member is arranged opposite to the pressing member. In a process of mounting the second structural body to the first structural body, the clamped member is driven by the locking portion to move relative to the second mounting portion, and is restored so as to be engaged with the locking portion. In a process of detaching the second structural body from the first structural body, the pressing member is capable of being pressed to drive the clamped member to move, so as to enable the clamped member to be disengaged from the locking portion.

In the locking structure provided by the embodiments of the present disclosure, the pressing member and the clamped member are configured to be connected between the first structural body and the second structural body, and the clamped member can be configured to be engaged with the locking portion of the second structural body. With the structures of the clamped member and the locking portion which are movably engaged, the second structural body is enabled to be conveniently connected to and detached from the first structural body. For example, in the process of mounting the second structural body to the first structural body, the clamped member is driven by the locking portion to move relative to the first structural body, and is restored so as to be engaged with the locking portion; in this way, the second structural body is enabled to be conveniently mounted to the first structural body. For another example, in the process of detaching the second structural body from the first structural body, the pressing member can be pressed to drive the clamped member to move so as to be disengaged from the locking portion; in this way, the second structural body is enabled to be conveniently detached from the first structural body. When the locking structure is applied to a smart wearable device, a detachable connection of the device body with a wearable part can be conveniently achieved by means of the locking structure.

The technical solutions in the embodiments of the present disclosure will be clearly and comprehensively described in connection with the accompanying drawings in the embodiments of the present disclosure.

As illustrated in FIG. 1, an embodiment of the present disclosure provides a locking structure 100 for connecting two parts, which enables the two parts to be detachably connected together, and enables the two parts connected to be easily detached from each other. The locking structure 100 includes a first structural body 10, a second structural body 30, and a connecting assembly 50. The connecting assembly 50 is connected between the first structural body 10 and the second structural body 30, for realizing the detachable connection of the first structural body 10 and the second structural body 30. In a specific application embodiment, the first structural body 10 may be provided on one of two parts that need to be connected, and the second structural body 30 may be provided on the other one of the two parts that need to be connected; as such, the two parts may be detachably connected. The first structural body 10 and the second structural body 30 may be structural components of the parts that need to be connected, or may be attached to structures of the parts that need to be connected, which is not limited in the present disclosure, and thus the locking structure 100 can be widely applied.

Figure 2:
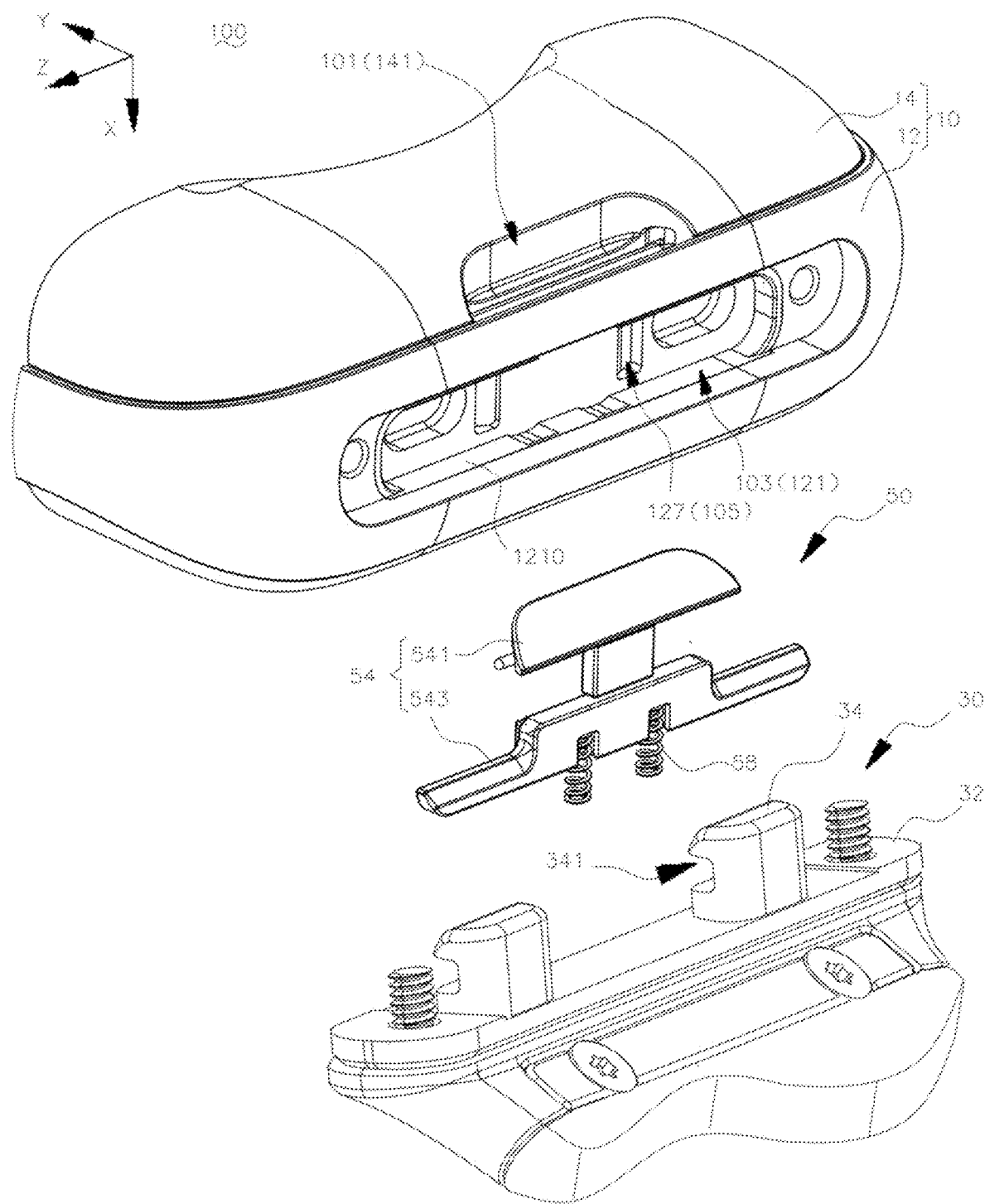
FIG. 2 is an exploded view illustrating the locking structure illustrated in FIG. 1 from a first perspective.
Figure 17:
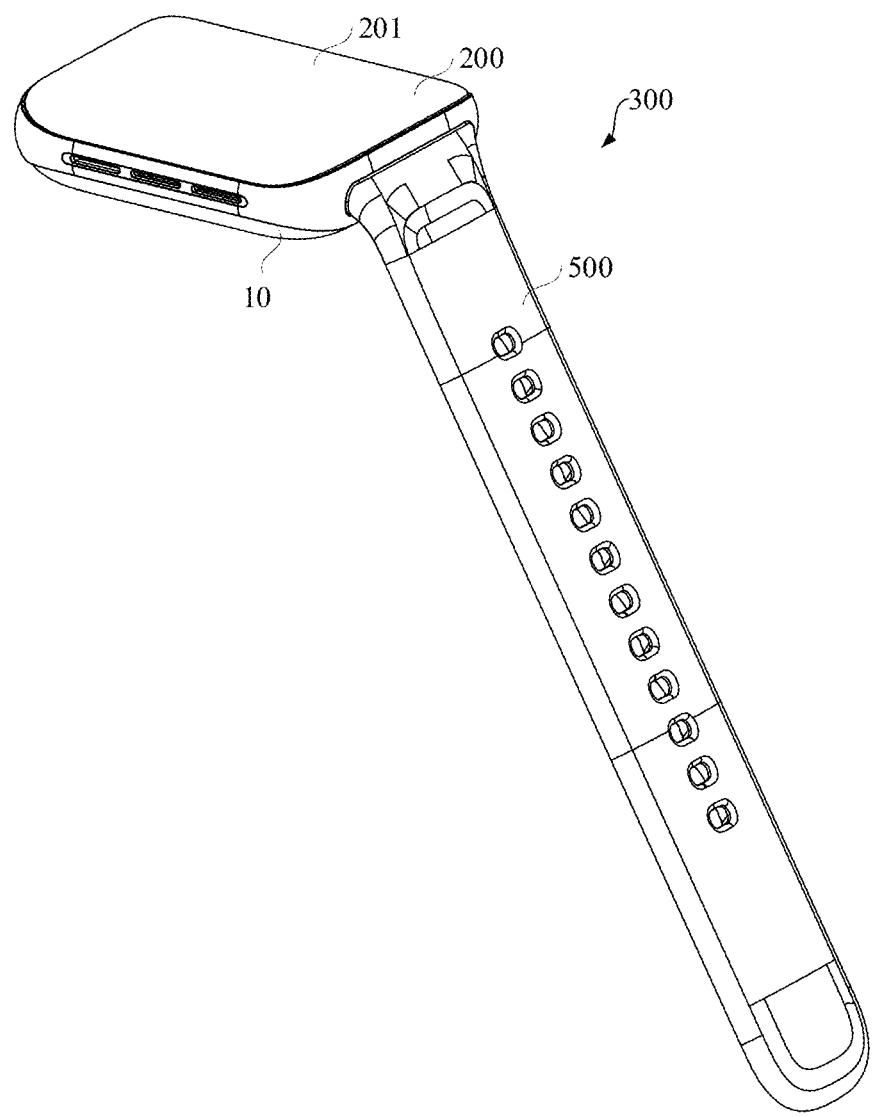
FIG. 17 is a schematic perspective view illustrating an electronic device according to an embodiment of the present disclosure.

As illustrated in FIG. 2, in the embodiment of the present disclosure, the first structural body 10 is provided with a first mounting portion 101 and a second mounting portion 103. The first mounting portion 101 and the second mounting portion 103 are configured to mount the connecting assembly 50. The specific structures of the first mounting portion 101 and the second mounting portion 103 are not limited. For example, the first mounting portion 101 may include one or more of a mounting groove, a mounting hole, a snap-fit structure or other mounting and receiving structures, to facilitate the mounting of the connecting assembly 50. Similarly, the second mounting portion 103 may include one or more of a mounting groove, a mounting hole, a snap-fit structure or other mounting and receiving structures, to facilitate the mounting of the connecting assembly 50. The structure of the second mounting portion 103 may be the same as or different from the structure of the first mounting portion 101. For example, the first mounting portion 101 includes a key groove 1011, and the second mounting portion 103 may include a groove 1031 communicated with the key groove; where the key groove 1011 extends to an outer surface of a housing 14, that is, the key groove 1011 extends to a surface of the housing 14 for the user to touch. The groove 1031 may be provided in a middle frame 12, and the second structural body 30 may be mounted to an electronic device 500 (as illustrated in FIG. 17) through the groove 1031, and can be detached from the groove 1031. Specifically, in the embodiment, the groove 1031 may be used as a reference, two grooves 1031 are oppositely provided at two ends of the electronic device 500 in a length direction thereof, and a display screen module 120 and the housing 14 of the electronic device 500 are respectively located at two ends of the electronic device 500 in a thickness direction thereof. For simplicity, the length direction of the electronic device 500 may be regarded as a second direction, and the thickness direction of the electronic device 500 may be a first direction, that is, the first direction and the second direction are perpendicular to each other. The second structural body 30 can be installed into the groove 1031 along the second direction, and is confined at the first structural body 10. In the embodiments of the present disclosure, the first direction and the second direction are only used as a reference, for clearly and concisely describing the positions of the second structural body 30 and other parts relative to the middle frame 12, and this should not be regarded as strictly limiting the technical solution. For example, in other embodiments, there is no need to take the length direction of the electronic device 500 as the second direction or take the thickness direction of the electronic device 500 as the first direction; and in other embodiments, the first direction and the second direction may be at an acute angle.

The second structural body 30 includes a main body 32 and a locking portion 34 protruding from the main body 32. The locking portion 34 is configured to be engaged with the connecting assembly 50, for the detachable connection between the second structural body 30 and the first structural body 10.

The connecting assembly 50 includes a key 54. The key 54 is configured to connect the first structural body 10 and the second structural body 30. The key 54 includes a pressing member 541 and a clamped member 543. The pressing member 541 is movably provided at the first mounting portion 101, and is configured to move relative to the first mounting portion 101 (for example, move in the first direction X) under an external force. In the embodiment of the present disclosure, the pressing member 541 is positioned at the first structural body 10 through the first mounting portion 101. The clamped member 543 is positioned at the first structural body 10 through the second mounting portion 103, and is configured to be engaged with the locking portion 34. At least part of the structure of the clamped member 543 is arranged opposite to the pressing member 541. In the process of mounting the second structural body 30 to the first structural body 10, the clamped member 543 is driven by the locking portion 34 to move relative to the second mounting portion 103, and is restored so as to be engaged with the locking portion 34. In a process of detaching the second structural body 30 from the first structural body 10, the pressing member 541 can be pressed to drive the clamped member 543 to move so as to be disengaged from the locking portion 34. In the locking structure 100, the key 54 is connected between the first structural body 10 and the second structural body 30. While the key 54 is provided at the first structural body 10, the clamped member 543 thereof can be engaged with the locking portion 34 of the second structural body 30. The pressing member 541 may be utilized to drive the clamped member 543 to be movably engaged with the locking portion 34. Thus, the second structural body 30 can be conveniently connected to and detached from the first structural body 10.

In the embodiment of the present disclosure, with regard to the structure that the pressing member 541 and the clamped member 543 are arranged opposite to each other, it is not limited to one that the pressing member and the clamped member are directly opposite to and spaced apart from each other. In some embodiments, the pressing member 541 and the clamped member 543 may be opposite to each other in such a manner that, for example, at least partial structure of the pressing member 541 and at least partial structure of clamped member 543 are spaced apart from each other, or a middle element or component may be provided between the pressing member 541 and the clamped member 543. In some other embodiments, the pressing member 541 and the clamped member 543 may be opposite to each other and overlapped with or attached to each other, for example, at least partial structure of the pressing member 541 may abut against or be in surface contact with at least partial structure of the clamped member 543. In some further embodiments, there is a preset gap between the pressing member 541 and at least partial structure of the clamped member 543, and the width of the gap should be in a preset range. For example, the width of the gap may be greater than or equal to 0.1 mm and less than or equal to 1.5 mm. When the pressing member 541 is pressed by an external force, the pressing member 541 can push the clamped member 543 to move only if a distance that the pressing member 541 moves is greater than the width, thereby preventing disengagement of the clamped member 543 from the locking portion 34 that is caused when the pressing member 541 is pressed by mistake. As such, by making the pressing member 541 and at least partial structure of the clamped member 543 arranged opposite to each other, the pressing member 541 can be pressed to drive the clamped member 543 to move, that is, transmission of movement is enabled between the pressing member and the clamped member by means of the opposite position relationship thereof.

In the case where the pressing member 541 and the clamped member 543 are arranged opposite to each other, in order to ensure that the pressing member 541 can reliably drive the clamped member 543 to move, the pressing member 541 is positioned at the first mounting portion 101 or positioned at the first structural body 10 through the first mounting portion 101, and the clamped member 543 is positioned at the second mounting portion 103 or positioned at the first structural body 10 through the second mounting portion 103. In this specification, with regard to expression that a component is "positioned at" another component, it may be understood that the position of the former relative to the latter is generally defined through the structure of the latter itself or through a middle element, such that the former is movable within a predetermined range relative to the latter. For example, regarding the pressing member 541 being positioned at the first mounting portion 101, it may be understood that the pressing member 541 is limited within a predetermined movement range by means of the structure of the first mounting portion 101 or/and the third party component; alternatively, regarding the pressing member 541 being positioned at the first structural body 10 through the first mounting portion 101, it is understandable that the pressing member 541 is limited within the predetermined movement range by means of the structure of the first mounting portion 101, or it may be understood that the pressing member 541 is limited within the predetermined movement range by means of mating of the structure of the first mounting portion 101 with the structure(s) of the pressing member 541 or/and a third party component. The first mounting portion 101 for limiting the pressing member 541 may include a position-limiting structure such as a hole structure, a groove structure, and a guide rail structure. Through position-limiting cooperation of such position-limiting structure with the structure of the pressing member 541, the pressing member 541 is positioned. For another example, regarding the clamped member 543 being positioned at the first structural body 10 through the second mounting portion 103, it is understandable that the clamped member 543 is limited within a predetermined movement range by means of the structure of the second mounting portion 103, where the second mounting portion 103 for limiting the clamped member 543 may include a position-limiting structure such as a hole structure, a groove structure, and a guide rail structure. Through position-limiting cooperation of such position-limiting structure with the structure of the clamped member 543, the clamped member 543 is positioned. The position-limiting structure and positioning structure will be described in detail hereafter in the specification, according to some particular embodiments of the present disclosure.

In this way, at the time of assembling the pressing member 541 and the clamped member 543, the pressing member 541 can be positioned and mounted through the first mounting portion 101, and the clamped member 543 can be positioned and mounted through the second mounting portion 103, which avoids a fitting issue in installation that is caused due to a too long dimension chain generated when the pressing member 541 and the clamped member 543 are fixedly connected through other fastening structures. For example, in the related art, at the time of installing a key, multiple parts (such as a pressing portion and an abutting portion) of the key itself are firstly assembled together, and then the assembled key is mounted onto the first structural body. In this case, when any one of the pressing member and the clamped member has a manufacturing tolerance, the assembly obtained by firstly assembling the two parts together has a long dimension chain, which would inevitably cause a large installation error. When the whole of the two parts needs to be mounted onto the first structural body, the overall large installation error causes the overall dimension of the two parts to be extremely likely not to meet the assembly tolerance requirement of the whole and the first structural body, and the probability of failing to performing the mounting is greatly increased because the whole interferes with other parts of the first structural body. Therefore, there are high accuracy requirements on the manufacturing dimensions of the parts (such as the pressing member and the clamped member), and it is very produce and assemble. However, in this disclosure, the key 54 is designed as a pressing member 541 and a clamped member 543 which are substantially separated, and the pressing member 541 and the clamped member 543 can be respectively provided at the first mounting portion 101 and the second mounting portion 103 of the first structural body 10, so that the assembly requirements of positioning and assembling an individual part need to be met. There is no longer a dimension chain for assembly between the pressing member 541 and the clamped member 543, and there is a short dimension chain generated when the key 54 is mounted onto the first structural body 10, which reduces the difficulty of producing and assembling the locking structure 100.

The locking structure 100 provided in the present disclosure will be described in detail below with reference to the embodiments illustrated in the drawings.

In the embodiment illustrated in FIG. 2, the first structural body 10 includes a middle frame 12 and a housing 14 connected to the middle frame 12. In the embodiment, the housing 14 is substantially covered on the middle frame 12, and is configured to define a main appearance surface of the first structural body 10. The first mounting portion 101 is provided at the housing 14, and the second mounting portion 103 is provided at the middle frame 12. The middle frame 12 is configured to define a main supporting structure. For example, the middle frame 12 may be configured to define a supporting structure for pats connected thereto, so as to receive electronic components of the parts. For ease of description, in the specification, a first direction X, a second direction Y, and a third direction Z are defined with reference to a length direction, a width direction, and a height direction of the middle frame 12. As illustrated in FIG. 2, the first direction X is defined as the thickness direction of the middle frame 12, and the positive direction of the first direction X faces downward in the figure; the second direction Y is defined as the length direction of the middle frame 12, and the positive direction of the second direction Y faces towards the upper left in the figure; and the third direction Z is defined as the width direction of the middle frame 12, and the positive direction of the third direction Z faces towards the lower left in the figure. Further, the first direction X, the second direction Y, and the third direction Z may be perpendicular to each other. The middle frame 12 may be provided on a part to which the middle frame 12 needs to be connected, or may be an integral part of this part. For example, when the locking structure 100 is applied to a smart watch, the middle frame 12 may be provided at the body of the smart watch, or may be a part of the body. The shape of the middle frame 12 is not limited, and it may be a rectangular frame, a circular frame, or other block objects.

Figure 3:
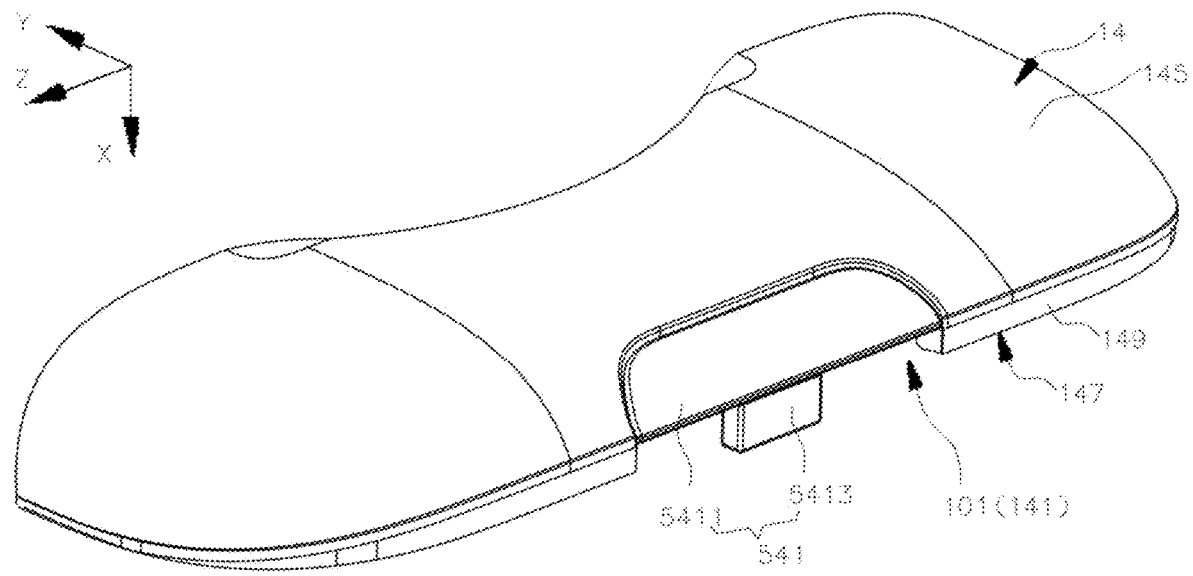
FIG. 3 is a perspective view illustrating an assembly of a housing and a pressing member of the locking structure illustrated in FIG. 1.
Figure 4:
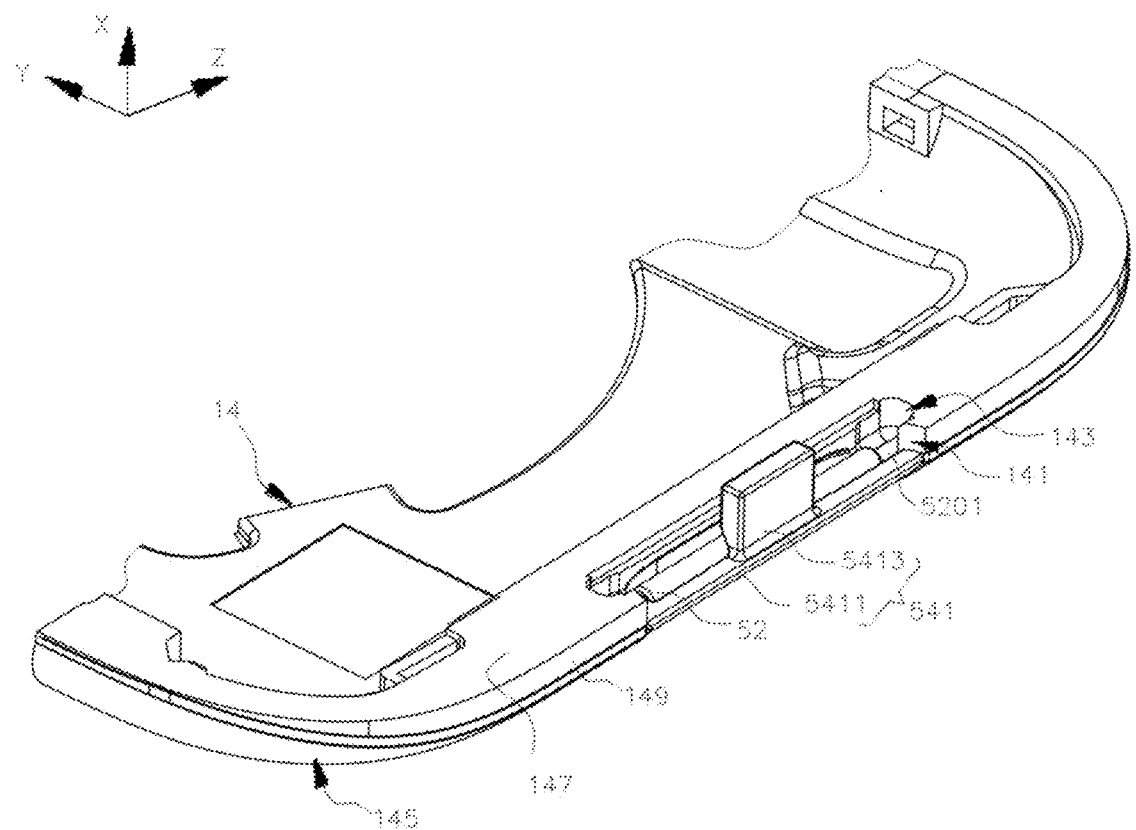
FIG. 4 is a perspective view illustrating the assembly of the housing and the pressing member illustrated in FIG. 3 from another perspective.
Figure 5:
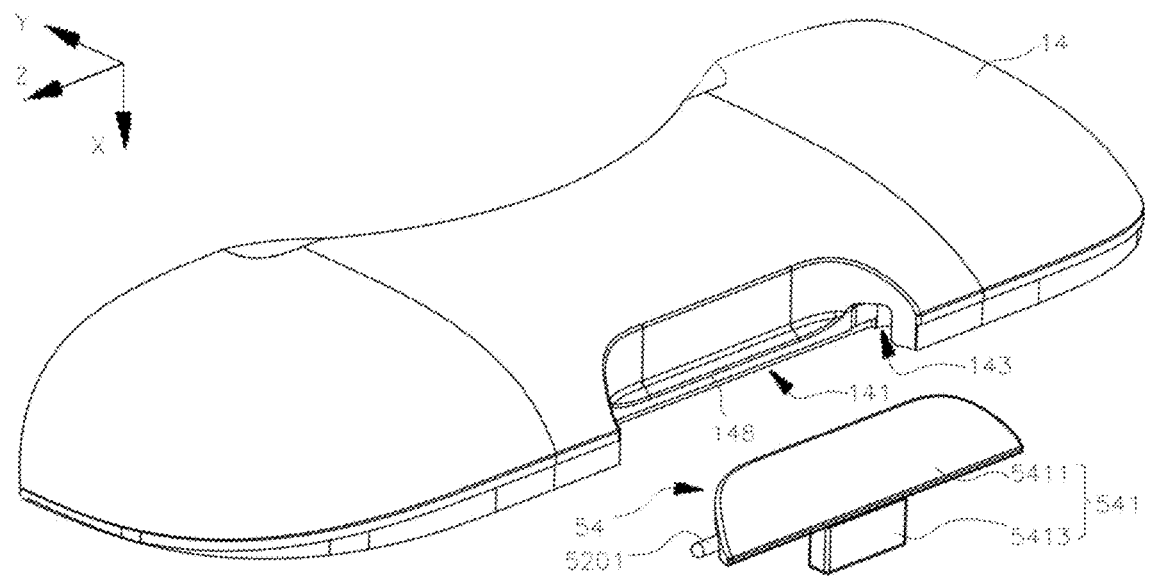
FIG. 5 is an exploded view illustrating the housing and the pressing member illustrated in FIG. 3.

As illustrated in FIG. 3, in the embodiment, the first mounting portion 101 may include an accommodating groove 141 provided in the housing 14, and the accommodating groove 141 runs through two opposite surfaces of the housing 14. In the embodiment, it may be defined that the accommodating groove 141 runs through the two opposite surfaces of the housing 14 along the first direction X, to define a direction along which the pressing member 541 moves in the accommodating groove 141, so as to allow the pressing member 541 to move in the accommodating groove 141 along the first direction X. In the embodiment, the accommodating groove 141 may be a notch provided at an edge of the housing 14, so as to facilitate formation and control over dimensional accuracy of the accommodating groove 141. For example, in the embodiment illustrated in FIG. 4 and FIG. 5, the housing 14 may include an outer surface 145, an inner surface 147 and a side wall surface 149. The outer surface 145 and the inner surface 147 face away from each other. The outer surface 145 is located on a side of the housing 14 away from the middle frame 12, the inner surface 147 is located on a side of the housing 14 facing towards the middle frame 12, and the side wall surface 149 is connected between the outer surface 145 and the inner surface 147. The accommodating groove 141 runs through the outer surface 145 and the inner surface 147, and extends to the side wall surface 149, so as to define a notch structure in the housing 14, which is beneficial for the formation of the accommodating groove 141. And when the accommodating groove 141 is configured to accommodate the structure of the key 54, the structure of the key 54 may be made closer to the edge of the housing 14, which is beneficial to make more space inside the first structural body 10 available for installation of other electronic components, thereby facilitating improvement of the space utilization. In other embodiments, the accommodating groove 141 may be provided at other portions of the housing 14. For example, the accommodating groove 141 may be a through hole provided at a position close to an edge of the housing 14, but it does not need to extend to the side wall surface 149.

Further, the outer surface 145 of the housing 14 may be a curved surface to provide a smooth appearance surface, so that there is a good touch for the user. When the pressing member 541 is installed in the accommodating groove 141, the outer surface of the pressing member 541 and the outer surface 145 of the housing 14 may be coplanar, so that the locking structure 100 has a relatively consistent appearance. In the embodiment, the expression "coplanar" may be understood as coplanarity of planar surfaces or/and curved surfaces. That is, the surface of the pressing member 541 and the outer surface 145 of the housing 14 are substantially flush at the joint, where the two are substantially continuous arc surfaces, and they present a substantially smooth transition at the joint.

In some embodiments, the first structural body 10 may be provided with a position-limiting portion 143. The position-limiting portion 143 is used to be mate with the pressing member 541 to define a position of the pressing member 541 in the accommodating groove 141, so that the pressing member 541 can be reliably mounted on the housing 14. It can be seen that, in the embodiment, the accommodating groove 141 and the position-limiting portion 143 together form a main structure of the first mounting portion 101 for mounting of the pressing member 541. Certainly, in other embodiments, the structure of the first mounting portion 101 is not limited thereto, and it may further include other snap-fit structures and accommodating structures, as long as the positioning and mounting of the pressing member 541 can be implemented, which will not be enumerated herein.

Figure 6:
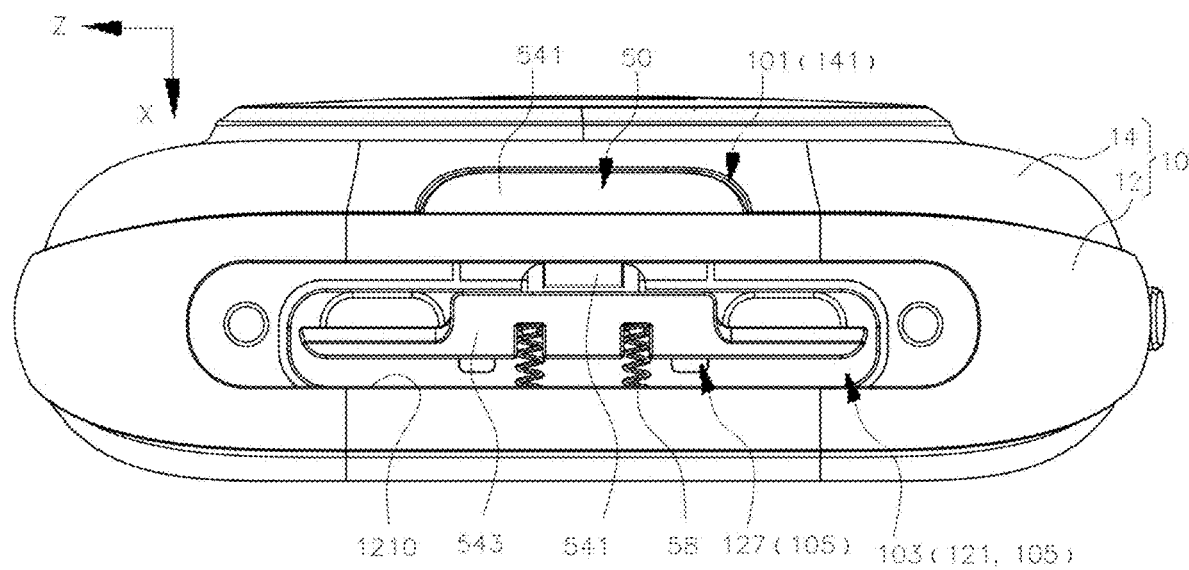
FIG. 6 is an orthogonal view illustrating an assembly of a first structural body and a key, which mate with each other, of the locking structure illustrated in FIG. 1.

As illustrated in FIG. 6, the second mounting portion 103 is a mounting structure provided at the middle frame 12. For example, the second mounting portion 103 may include a hole, a groove, a snap-fit structure or the like on the middle frame 12. For example, the middle frame 12 may be provided with a positioning structure for mating with the clamped member 543, and the positioning structure may be regarded as the second mounting portion 103. For example, the middle frame 12 may be provided with a first positioning portion 105, and the clamped member 543 may be correspondingly provided with a second positioning portion 5438 (illustrated in FIG. 8). The second positioning portion 5438 mates with the first positioning portion, to position the clamped member 543 at the middle frame 12. In this case, the first positioning portion 105 may be regarded as constituting the structure of the second mounting portion 103, or it may be considered that the second mounting portion 103 includes the first positioning portion 105. The structure of the first positioning portion 105 is not limited, and it may be a hole, a groove structure, a snap-fit structure or the like provided on the middle frame 12. In the embodiment illustrated in FIG. 6, the second mounting portion 103 or the first positioning portion 105 may include a receiving space 121 provided in the middle frame 12, and the receiving space 121 is configured to receive the clamped member 543. The receiving space 121 and the accommodating groove 141 are generally arranged opposite each other, to jointly receive the connecting assembly 50, and allow the pressing member 541 in the accommodating groove 141 to push the clamped member 543 in the receiving space 121 to move.

In the embodiment, the second mounting portion 103 or the first positioning portion 105 may further include a holding hole 127 provided in the middle frame 12. The holding hole 127 is communicated with the receiving space 121, and is configured to hold the second positioning portion 5438 of the clamped member 543, so as to position the clamped member 543 in the receiving space 121. For example, the second positioning portion 5438 may be a holding protrusion 5439 (illustrated in FIG. 8) provided on the clamped member 543. The holding protrusion 5439 may be movably accommodated in the holding hole 127, to realize positioning and mounting of the clamped member 543. The size of the holding protrusion 5439 in the first direction X is smaller than the size of the holding hole 127 in the first direction X, so that the holding protrusion 5439 can move along the first direction X in the holding hole 127, thereby ensuring the movement degree of freedom of the clamped member 543 in the first direction X. Further, the size of the holding protrusion 5439 in the third direction Z is slightly smaller than or equal to the size of the holding hole 127 in the third direction Z, so as to limit the movement degree of freedom of the clamped member 543 in the third direction Z, thereby preventing the clamped member 543 from moving in the third direction Z, and ensuring reliable positioning of the clamped member 543 in the receiving space 121. It can be seen that, in the embodiment, the holding hole 127 may serve as a guiding structure, and the holding hole 127 and the receiving space 121 together define a main structure (that is, the first positioning portion 105) of the second mounting portion 103 for mounting of the clamped member 543.

In some other embodiments, the holding hole 127 may be replaced by a guide groove structure, and the holding protrusion 5439 may be movably provided in the guide groove structure and can move relative to the first structural body 10 in the first direction X. In other embodiments, a mating structure enabling the positioning between the clamped member 543 and the second mounting portion 103 may include a guide rail and a guide channel which mate with each other. For example, one of the first positioning portion 105 and the second positioning portion 5438 includes a guiding structure such as a guide rail or a guide channel, where such guiding structure is provided in a predetermined direction such as the first direction X; and the other one of the first positioning portion 105 and the second positioning portion 5438 includes a sliding component (for example, a sliding block, a protrusion or a like structure). The sliding component may be slidably connected to the guiding structure such as the guide rail (or the guide channel), and may be slide on the guiding structure along the first direction X. In the way, the clamped member 543 can be conveniently positioned at the first structural body 10 through the second mounting portion 103.

In other embodiments, the holding hole 127 may be omitted. For example, the second mounting portion 103 or the first positioning portion 105 may include only the receiving space 121 provided in the middle frame 12, and the size of the receiving space 121 is adapted to the size of the clamped member 543 to position and install the clamped member 543 to the second mounting portion 103. Specifically, the middle frame may include an inner wall 1210 provided at the receiving space 121. The inner wall 1210 defines a scope of the receiving space 121 in such a manner that the receiving space 121 has a size parameter which may be referenced relatively, and the clamped member 543 is provided in a space surrounded by the inner wall 1210. Further, the size of the holding protrusion 5439 in the first direction X is smaller than the size of the receiving space 121 in the first direction X, so that the holding protrusion 5439 can move along the first direction X in the receiving space 121, thereby ensuring the movement degree of freedom of the clamped member 543 in the first direction X. Further, the size of the holding protrusion 5439 in the third direction Z is slightly smaller than or equal to the size of the receiving space 121 in the third direction Z, so as to restrict the movement degree of freedom of the clamped member 543 in the third direction Z, thereby preventing the clamped member 543 from moving in the third direction Z, and ensuring reliable positioning of the clamped member 543 in the receiving space 121.

Certainly, in other embodiments, the structure of the second mounting portion 103 is not limited thereto, and the second mounting portion 103 may further include other snap-fit structures and accommodating structures, as long as the positioning and mounting of the clamped member 543 can be implemented, which will not be enumerated herein. In some embodiments, the second mounting portion 103 may also be considered as at least a part of the structure of the middle frame 12. For example, the second mounting portion 103 may be understood as a part of the middle frame 12 where the receiving space 121 is provided, or may be understood as a part of the middle frame 12 where the holding hole 127 or a hole or groove structure used for positioning is provided, or may be understood as a part of the middle frame 12 where the receiving space 121 and the holding hole 127 are provided, or may also be understood as the whole structure of the middle frame 12. On this basis, the clamped member 543 can be conveniently positioned to the first structural body 10 through the second mounting portion 103 (for example, a physical structure of the middle frame 12, a hole or a groove structure), and the positioning does not depend on the connection or fixing structure between the clamped member 543 and the pressing member 541. Thus, the positioning and mounting of the clamped member 543 can be performed separately from the positioning and mounting of the pressing member 541, the original dimension chain of the key 54 is broken, and there is a short dimension chain generated when the key 54 is mounted to the first structural body 10, which reduces the difficulty of producing and assembling the locking structure 100.

When the clamped member 543 is mounted to the second mounting portion 103, at least partial structure of the clamped member is arranged opposite to the pressing member 541 mounted to the first mounting portion 101. When the pressing member 541 is pressed by an external force, the pressing member 541 moves towards the clamped member 543 along the first direction X, and can push the clamped member 543 to move along the first direction X. On the basis that the positioning and mounting of the pressing member 541 are performed separately from the positioning and mounting of the clamped member 543, transmission of movement is enabled between the pressing member and the clamped member by means of the opposite position relationship thereof, which avoids the difficulty in installation that is caused due to a too long dimension chain generated when the pressing member 541 and the clamped member 543 are fixedly connected through other fastening structures. In this way, the pressing member 541 is positioned and mounted at the housing 14, and the clamped member 543 is positioned and mounted at the middle frame 12, and there is no need to make the pressing member 541 and the clamped member 543 strictly assembled together and then mounted to the first structural body 10. There is no longer a dimension chain for assembly between the pressing member 541 and the clamped member 543, and there is a short dimension chain generated when the key 54 is mounted onto the first structural body 10, which reduces the difficulty of producing and assembling the locking structure 100.

Figure 7:
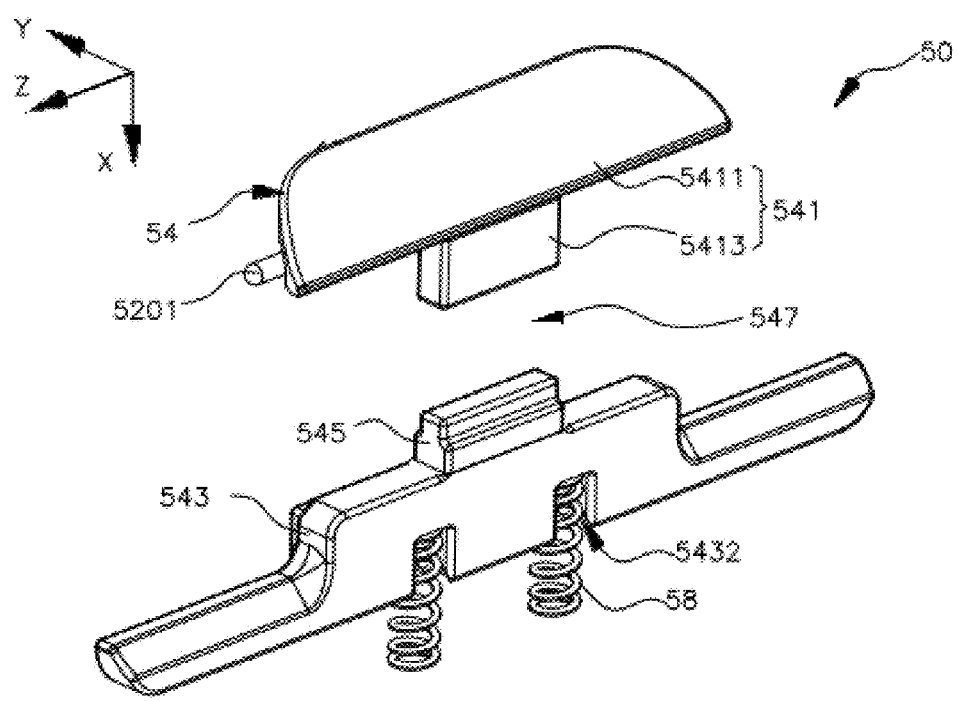
FIG. 7 is a perspective view illustrating the key of the locking structure illustrated in FIG. 2.

With regard to the structure that the pressing member 541 and the clamped member 543 are arranged opposite to each other after being mounted to the first structural body 10, it is not limited to one that the pressing member and the clamped member are directly opposite to and spaced apart from each other, and a middle element or component may be provided therebetween to improve the stability of the overall structure of the connecting assembly 50. For example, in some embodiments, as illustrated in FIG. 7, the key 54 may further include a buffer component 545, and the buffer component 545 is provided between the pressing member 541 and the clamped member 543. The buffer component 545 may be made of an elastic material, and may be configured to reduce an impact force between the pressing member 541 and the clamped member 543, thereby avoiding wear to the mating parts between the pressing member 541 and the clamped member 543, and improving the hand feeling of pressing the key 54. Further, the buffer component 545 may be configured to apply a supporting force to the pressing member 541, which enables the mating between the pressing member 541 and the position-limiting portion 143 to be reliable. Thus, the size of a gap between the pressing member 541 and the side wall of the accommodating groove 141 is enabled to be in the preset range. This avoids a position offset of the key 54 relative to the accommodating groove 141 that would be caused due to loosening of the key 54 after being reused many times. In addition, this ensures that the circumferential mounting gap of the key 54 always meets a predetermined dimensional requirement, where the mounting gap is uniform and controllable. Accordingly, the structure of the locking structure 100 is enabled to have a high quality, and it is beneficial to ensure a good use experience of the user.

As illustrated in FIG. 7, in the embodiment, when the second structural body 30 is confined at the first structural body 10, there is a spacing 547 between the pressing member 541 and the clamped member 543 in the moving direction along which the pressing member 541 moves relative to the first structural body 10, and at least part of the buffer component 545 is provided in the spacing 547 to fill the spacing 547. In the embodiments of the present disclosure, one object being confined at another object may be understood that one object may limit the movement range of the other object, and the two objects are generally difficult to be disengaged from each other. For example, in the embodiment, the second structural body 30 being confined at the first structural body 10 means that, the first structural body 10 may limit the movement range of the second structural body 30, and the second structural body 30 generally cannot easily be detached from the first structural body 10. When the second structural body 30 is confined at the first structural body 10, due to a gap between the second structural body 30 and the first structural body 10, the second structural body 30 can move or rotate relative to the first structural body 10 within a small range. In some embodiments, the second structural body 30 may also be in tight fit with the first structural body 10 such that the second structural body 30 is almost fixedly connected to the first structural body 10.

In some embodiments, the pressing member 541 has a first position and a second position relative to the first structural body 10. In the first position, the clamped member 543 is configured to: mate with the second structural body 30, so as to make the second structural body 30 confined at the first structural body 10; and squeeze the buffer component 545, to make the buffer component 545 abut against the pressing member 541, so as to make the pressing member 541 confined at the groove 1031. When being pressed, the pressing member 541 moves to the second position relative to the first structural body 10, and in the process of switching the pressing member 541 from the first position to the second position, the pressing member 541 squeeze the buffer component 545 and drives the clamped member 543 to move. In the second position, the clamped member 543 is disengaged from the second structural body 30, so that the second structural body 30 can be detached from the first structural body 10.

Further, in the embodiment, the buffer component 545 may be a block made of an elastic material, so as to improve the structural stability thereof, and enhance the supporting force to the pressing member 541. For example, the buffer component 545 may be made of a material such as rubber or plastic. The buffer component 545 may also be an elastic structure having an elastic deformation capability, for example, it may be an elastic structure made of a non-elastic material. Specifically, the buffer component 545 may be an elastic structure such as an elastic sleeve, an elastic sheet, or a spring, to apply a supporting force to the pressing member 541, so that the size of the gap between the pressing portion 5411 and the side wall of the accommodating groove 141 meets the requirement, and transmission of movement may be reliably performed between the pressing member 541 and the clamped member 543. In the embodiments of the present disclosure, since the buffer component 545 capable of generating elastic deformation is provided between the pressing member 541 and the clamped member 543, the elastic deformation of the buffer component 545 can be utilized to adapt to the change in the size of the gap between the pressing member 51 and the clamped member 543, thereby making the assembly gap between the components of the locking structure 100 more easily meet the tolerance requirement.

For example, in a structure in which the buffer component 545 is not used, if the pressing member 541 and the clamped member 543 are in direct contact with each other, when any one of the pressing member 541 and the clamped member 543 has a manufacturing tolerance, the assembly obtained by directly making the pressing member 541 abut against the clamped member 543 has a long dimension chain, which would inevitably cause a large installation error. When the pressing member 541 and the clamped member 543 need to be mounted onto the first structural body 10 after being assembled together, it would be unable to perform the mounting since the large installation error would probably cause interference with other parts of the first structural body 10. In this case, in order to reduce the probability of this phenomenon, there are high requirements on the manufacturing accuracy of the pressing member 541 and the clamped member 543, and the production cost is also increased. In the present embodiment, the pressing member 541 and the clamped member 543 are arranged opposite to and spaced apart from each other and a mounting gap is provided therebetween, and the buffer component 545 is provided in the mounting gap between the pressing member 541 and the clamped member 543. As such, when any one of the pressing member 541 and the clamped member 543 has a manufacturing tolerance, in order to limit the installation error produced after the pressing member 541, the clamped member 543 and the buffer component 545 are assembled, the buffer component 545 may be compressed to make the mounting gap reduced. In this case, at the time of mounting the pressing member 541, the clamped member 543 and the buffer component 545, which have been assembled together, to the first structural body 10, the mounting gap can be changed due to the elastic deformation (compression) of the buffer component 545, so that the overall structure and size of the three are adapted to the size requirement of the first structural body 10. This means that the manufacturing tolerances and the installation errors of the pressing member 541 and the clamped member 543 are compensated by the buffer component 545, which greatly reduces the requirements on the manufacturing accuracy of the pressing member 541 and the clamped member 543, and also reduces the assembly difficulty and the production cost.

In the embodiments of the present disclosure, when the buffer component 545 is provided between the pressing member 541 and the clamped member 543, the connection of the buffer component 545 with each of the pressing member 541 and the clamped member 543 is not limited. In some embodiments, the buffer component 545 may be directly provided between the pressing member 541 and the clamped member 543, without being physically connected with the pressing member 541 or the clamped member 543. For example, the buffer component 545 may be positioned by means of the structure of the middle frame 12, or the buffer component 545 is clamped by the pressing member 541 and the clamped member 543. In other embodiments, the buffer component 545 may be physically connected with one of the pressing member 541 and the clamped member 543, and be arranged opposite to and spaced apart from or overlapped with or attached to the other one of the pressing member 541 and the clamped member 543. In other embodiments, two sides of the buffer component 545 may be connected to the pressing member 541 and the clamped member 543, respectively; for example, the buffer component 545 may be connected to each of the pressing member 541 and the clamped member 543 through a mating structure including a groove and a protrusion, this is beneficial for the buffer component 545, the pressing member 541 and the clamped member 543 to substantially form a whole module, the structure of which is stable and reliable, and which is convenient to disassemble and assemble.

Figure 8:
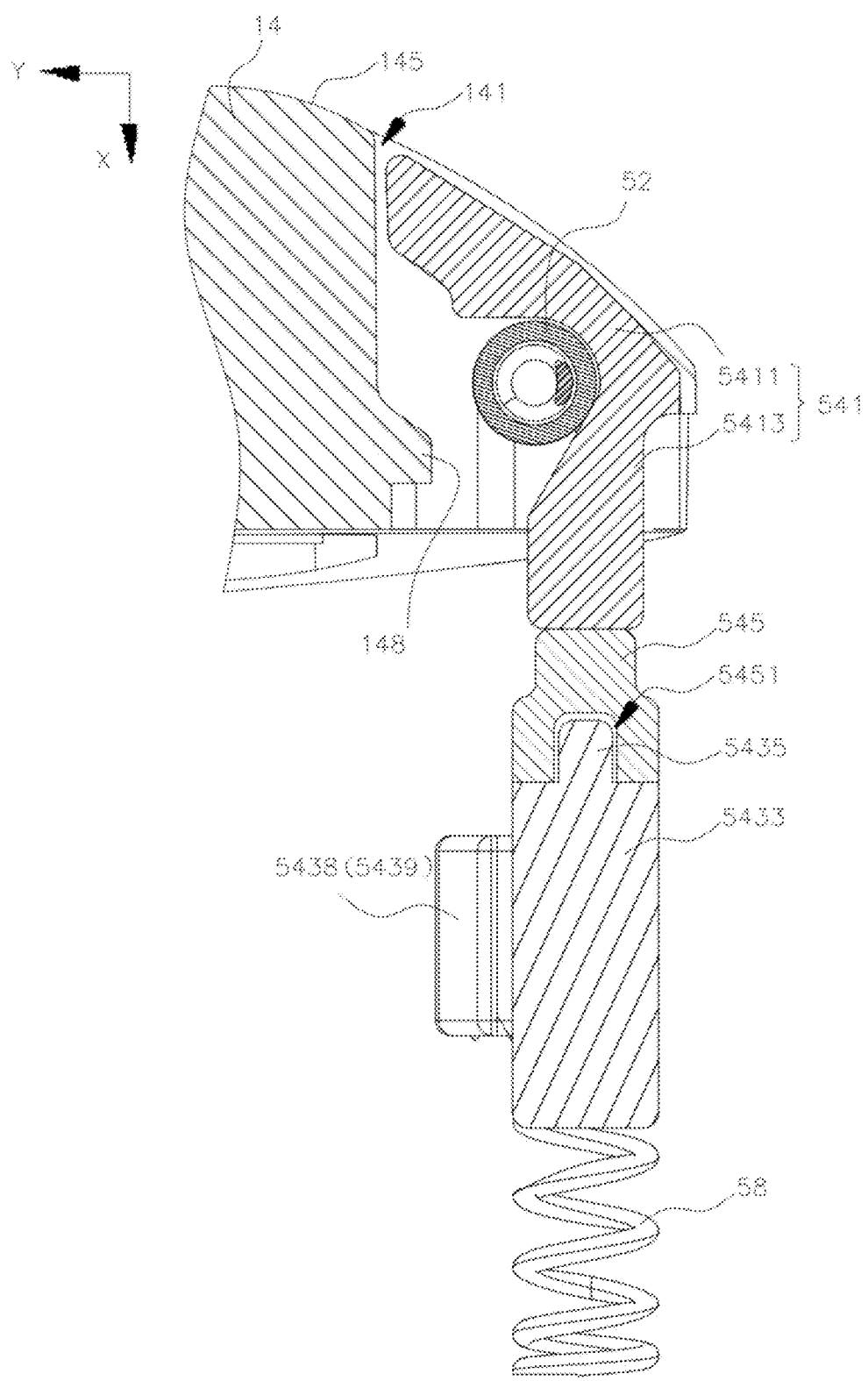
FIG. 8 is a schematic cross-sectional view illustrating mating of the key illustrated FIG. 7 with the housing.

As illustrated in FIG. 7 and FIG. 8, in the embodiments, the buffer component 545 is connected to the clamped member 543. Further, the buffer component 545 is provided with a first connection portion 5451. The first connection portion 5451 is configured to be detachably connected with the clamped member 543, so that the structure of the buffer component 545 is more stable and reliable. In other embodiments, the first connection portion 5451 may be configured to be connected to the pressing member 541.

In this embodiment, in order to adapt to the connection structure of the buffer component 545, the clamped member 543 may include an abutting portion 5431 and a clamped portion 5433. The abutting portion 5431 is configured for connection with the buffer component 545. The clamped portion 5433 is connected to the abutting portion 5431, and is configured to be engaged with the locking portion 34.

The abutting portion 5431 is provided on a side facing towards the pressing member 541, and may be arranged opposite to and spaced apart from the pressing member 541, or may be in a surface contact with the pressing member 541, or may be in contact with the pressing member 541 through a middle component (such as the buffer component 545). For example, in the embodiment, a buffer component 545 is provided between the clamped member 543 and the pressing member 541, the abutting portion 5431 abuts against the buffer component 545, and the buffer component 545 abuts against an end of the pressing member 541. The clamped portion 5433 is provided at an end of the abutting portion 5431, and is arranged opposite to and spaced apart from the first structural body 10. A clamping space 5434 is defined between the clamped portion 5433 and the first structural body 10. The clamping space 5434 is configured to receive the locking portion 34 of the second structural body 30; at that time, the locking portion 34 is movably provided in the clamping space 5434.

Figure 9:
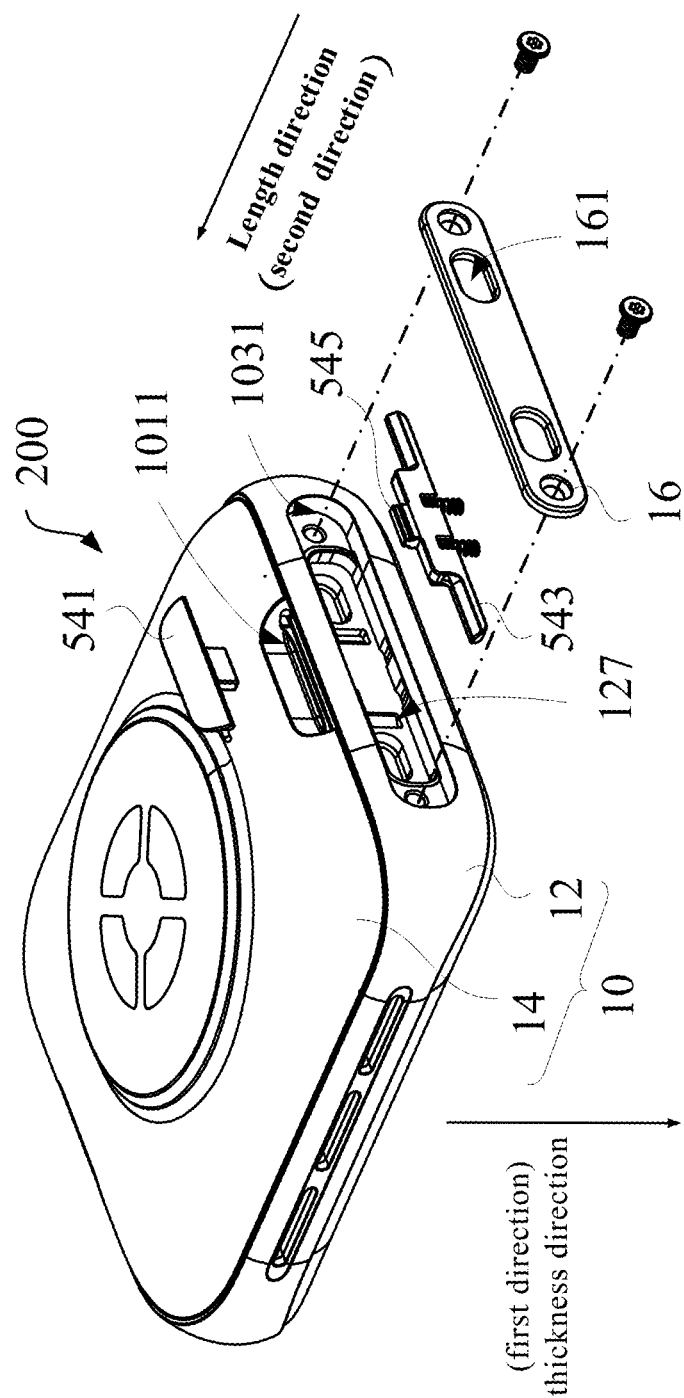
FIG. 9 is an exploded view illustrating the first structural body of the locking structure illustrated in FIG. 1.

Further, as illustrated in FIG. 9, in the embodiment, the locking structure 100 may include a baffle 16 detachably connected to the first structural body 10. The baffle 16 is provided at the second mounting portion 103, and shields at least part of the clamped member 543. The baffle 16 is provided with a through hole 161 for receiving the locking portion 34. The cross section of the baffle 16 may be racetrack shaped, and may be provided with a connection hole and the through hole 161 corresponding to the locking portion 34. The connection hole may be configured to receive a threaded fastener, to achieve the detachable connection of the baffle 16 to the first structural body 10. Further, the baffle 16 may also limit the movement of the clamped member 543 in the second mounting portion 103, to enable the clamped member 543 to move smoothly in the second mounting portion 103.

After the locking portion 34 is mounted to the first structural body 10, the main body 32 is located on a side of the baffle 16 facing away from the clamped member 543, and the through hole 161 can restrict movement of the locking portion 34 in a moving direction relative to the first structural body 10. In an embodiment in which there are two locking portions 34, the number of the through holes 161 is the same as the number of the locking portions 34, and the shape of the through hole 161 matches the shape of the locking portion 34. For example, in some embodiments, the locking portion 34 is cylindrical, the through hole 161 is circular, and the diameter of the circular hole is substantially equal to the diameter of the locking portion 34. In some other embodiments, the locking portion 34 may be prismatic, such as a triangular prism, a quadrangular prism, or a pentagonal prism, and the shape of the cross section of the through hole 161 matches the shape of the locking portion 34. As such, the through hole 161 and the locking portion 34 may fit tightly, which facilitates the waterproof and dust-proof design of the wearable device. With the through hole 161, the movement of the locking portion 34 may also be guided and limited, which prevents the movement of the locking portion 34 in the second mounting portion 103 from being deflected, and enables the locking portion 34 to smoothly push the clamped member 543 to move in the second mounting portion 103.

In order to ensure the reliability of the abutting between the abutting portion 5431, the buffer component 545 and the pressing member 541, the connecting assembly 50 may further include a position-restoring member 58. The position-restoring member 58 is provided on a side of the abutting portion 5431 away from the buffer component 545, and located between the abutting portion 5431 and the first structural body 10 (for example, the middle frame 12 or the housing 14), to apply, to the abutting portion 5431, a supporting force towards the buffer component 545. In the process of detaching the second structural body 30 from the first structural body 10, the pressing member 541 may be pressed, and then the position-restoring member 58 is compressed to apply, to the clamped member 543, a supporting force towards the buffer component 545 and the pressing member 541. When the external force applied to the pressing portion 5411 is withdrawn, the position-restoring member 58 may apply a restoring force that provides movement of the whole of the clamped member 543 and the pressing member 541. In some embodiments, in an ordinary state, the position-restoring member 58 further applies, to the clamped member 543, a supporting force towards the buffer component 545 and the pressing member 541 (for example, in the ordinary state, the position-restoring member 58 is located between the clamped member 543 and the first structural body 10 and is in a compressed state), to ensure the reliability of the connection between the clamped member 543 and the locking portion 34.

Further, a side of the abutting portion 5431 facing away from the second positioning portion 5438 is provided with a receiving groove 5432, and at an end of the abutting portion 5431 facing away from the pressing member 541, the receiving groove 5432 extends to an end surface of the abutting portion 5431, and one end of the position-restoring member 58 is accommodated in the receiving groove 5432. In the present embodiment, there are two position-restoring members 58, and there is a one-to-one correspondence between the position-restoring members 58 and the receiving grooves 5432. The second positioning portion 5438 may guide and limit the movement of the clamped member 543 in the accommodating groove 141. In some other embodiments, the position of the receiving groove 5432 may correspond to the position of the second positioning portion 5438, that is, the thickness of the abutting portion 5431 is thicker at the position where the receiving groove 5432 is located. Such arrangement can not only use the mating of the second positioning portion 5438 with the accommodating groove 141 to guide and limit the clamped member 543, but also improve the structural strength of the abutting portion 5431 at the receiving groove 5432, to improve the strength of the connection structure between the position-restoring member 58 and the abutting portion 5431.

Figure 10:
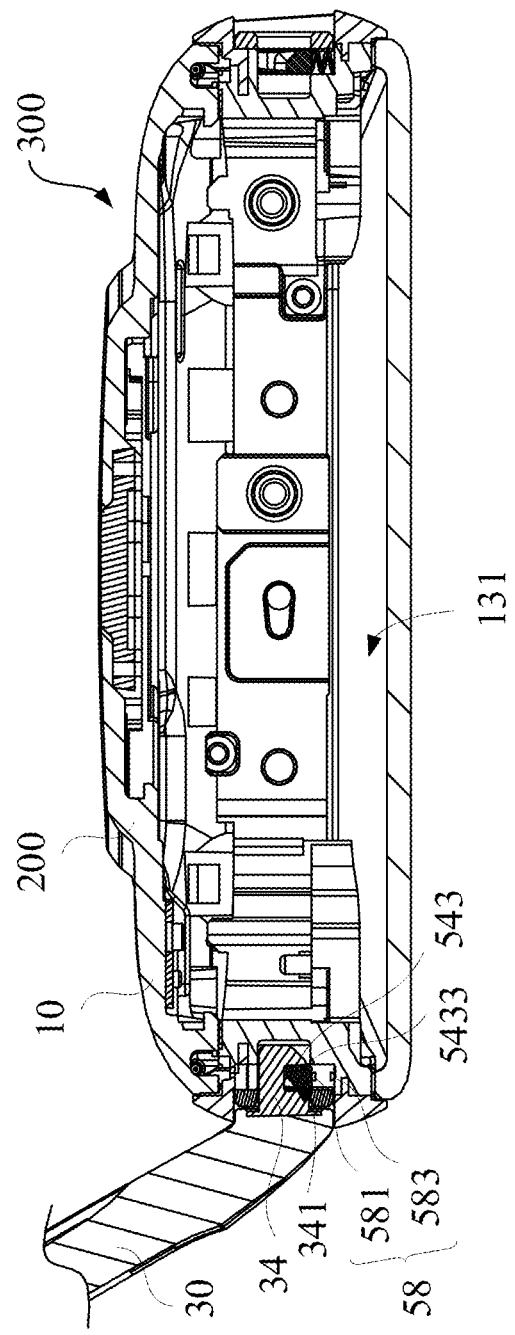
FIG. 10 is a cross-sectional view illustrating the locking structure illustrated in FIG. 1.

As illustrated in FIG. 10, in other embodiments, the position-restoring member 58 may include a first magnet 581 and a second magnet 583. The first magnet 581 is connected to the clamped member 543, and the second magnet 583 is connected to the first structural body 10. In the process of mounting the locking portion 34 into the second mounting portion 103, the first magnet 581 and the second magnet 583 approach each other and generate a magnetic repulsion force.

Further, as illustrated in FIG. 8, in order to enhance the connection between the buffer component 545 and the clamped member 543, in some embodiments, the clamped member 543 may further include a second connection portion 5435. The second connection portion 5435 is connected to the abutting portion 5431, and is configured to mate with the first connection portion 5451 of the buffer component 545, such that the buffer component 545 is fixed relative to the clamped member 543. One of the first connection portion 5451 and the second connection portion 5435 is a groove, and the other one there is a protrusion matching the groove. Though engagement of the groove and the protrusion, the second connection portion 5435 and the first connection portion 5451 may mate with each other by means of a simple structure. Specifically, the first connection portion 5451 may be a groove provided in the buffer component 545, and the second connection portion 5435 may be a protrusion provided on the abutting portion 5431. In other embodiments, the first connection portion 5451 and the second connection portion 5435 may be other connection structures, such as a hook structure or a sticker structure. In the embodiment, the connection structure between the first connection portion 5451 and the second connection portion 5435 is applied between the buffer component 545 and the pressing member 541. It is understandable that, in other embodiments, the connection structure between the first connection portion 5451 and the second connection portion 5435 may be applied between the buffer component 545 and the pressing member 541. For example, the second connection portion 5435 may be provided at one end of the pressing member 541, and mate with the first connection portion 5451 of the buffer component 545, which will not be enumerated herein.

In the embodiment illustrated in FIG. 8, the pressing member 541 is movably provided in the accommodating groove 141, to enable the key 54 to move in the accommodating groove 141 along the first direction X. The pressing member 541 includes a pressing portion 5411 and a projecting portion 5413 connected to the pressing portion 5411. The projecting portion 5413 may be integrally formed with the pressing portion 5411. In the embodiment, the pressing portion 5411 is substantially block-shaped, and is movably accommodated in the accommodating groove 141. The surface of the pressing portion 5411 is substantially coplanar with the outer surface 145 of the housing 14, such that the locking structure 100 has a consistent appearance. The projecting portion 5413 is provided on a side of the pressing portion 5411 away from the housing 14, projects out relative to the pressing portion 5411, and extends towards the clamped member 543. The projecting portion 5413 is substantially cylindrical, for connection to the clamped member 543.

In some embodiments, an elastic connection member 52 is fixedly connected to at least one of the pressing portion 5411 and the projecting portion 5413. The elastic connection member 52 is provided in the key groove 1011. And in the first position, the elastic connection member 52 abuts against the housing 14, such that the end surface of the pressing portion 5411 exposed from the housing 14 is flush with the surface of the housing 14 at the key groove 1011.

In some embodiments, the elastic connection member 52, the pressing portion 5411 and the projecting portion 5413 are integrally formed. For example, the elastic connection member 52 may be a projection extending from an edge of the pressing portion 5411. When the pressing member 541 is in the first position, the elastic connection member 52 abuts against a groove wall of the key groove 1011, so that the position of the pressing member 541 at the housing 14 is relatively fixed, and the end surface of the pressing portion 5411 exposed from the housing 14 is flush with the end surface of the housing 14 at the key groove 1011. It is understandable that, only the machining accuracy of the key groove 1011 and the machining accuracy of the elastic connection member 52 meet the requirements of assembly accuracy, the end surface of the pressing portion 5411 exposed from the housing 14 and the end surface of the housing 14 at the key groove 1011 can match at a high precision, to meet the requirement of being flush. For example, the elastic connection member 52 of the pressing member 541 may use the housing 14 as an assembly reference, to shorten the dimension chain for assembly, and decrease the influence of machining and assembly tolerances, so that it is easy to enable the end surface of the pressing portion 5411 exposed from the housing 14 to be flush with the end surface of the housing 14 at the key groove 1011.

In the present embodiment, the projecting portion 5413 is provided between the pressing portion 5411 and the clamped member 543. When an external force is applied to press the pressing portion 5411, the pressing portion 5411 drives the projecting portion 5413 to push the clamped member 543 to move along the first direction X, so as to release the engagement between the clamped member 543 and the locking portion 34. In the process of mounting the second structural body 30 to the first structural body 10, the locking portion 34 may move along the second direction Y to be inserted into the first structural body 10, and the clamped member 543 is driven by the locking portion 34 to move relative to the first structural body 10, and is restored under the support of the position-restoring member 58 so as to be engaged with the locking portion 34, where the second direction Y may substantially intersect with the first direction X (for example, the second direction Y is substantially perpendicular to the first direction X). During the process of detaching the second structural body 30 from the first structural body 10, the pressing member 541 can be pressed to enable the clamped member 543 to be disengaged from the locking portion 34.

Figure 11:
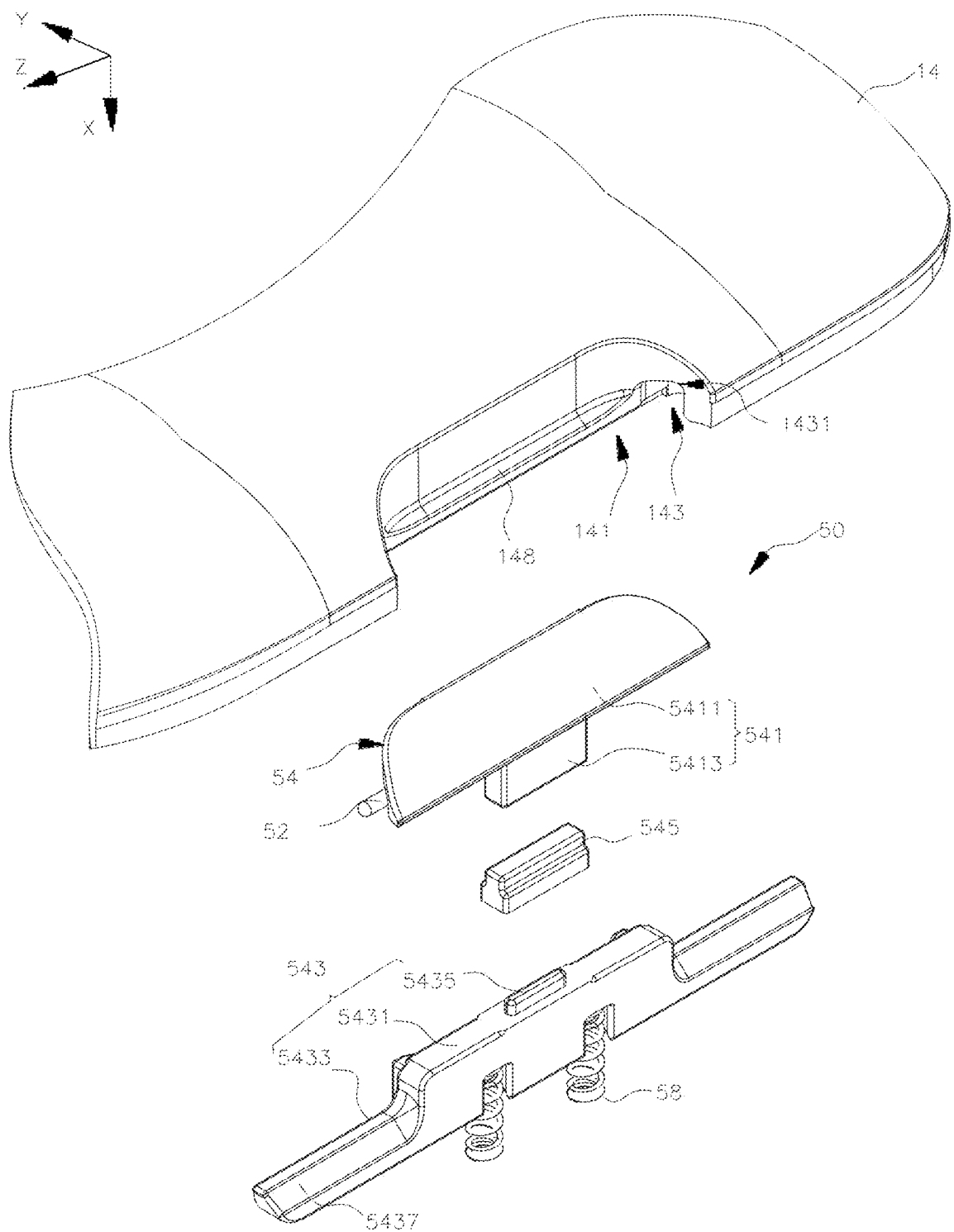
FIG. 11 is an exploded view illustrating a connecting assembly and the first structural body illustrated in FIG. 8.
Figure 12:
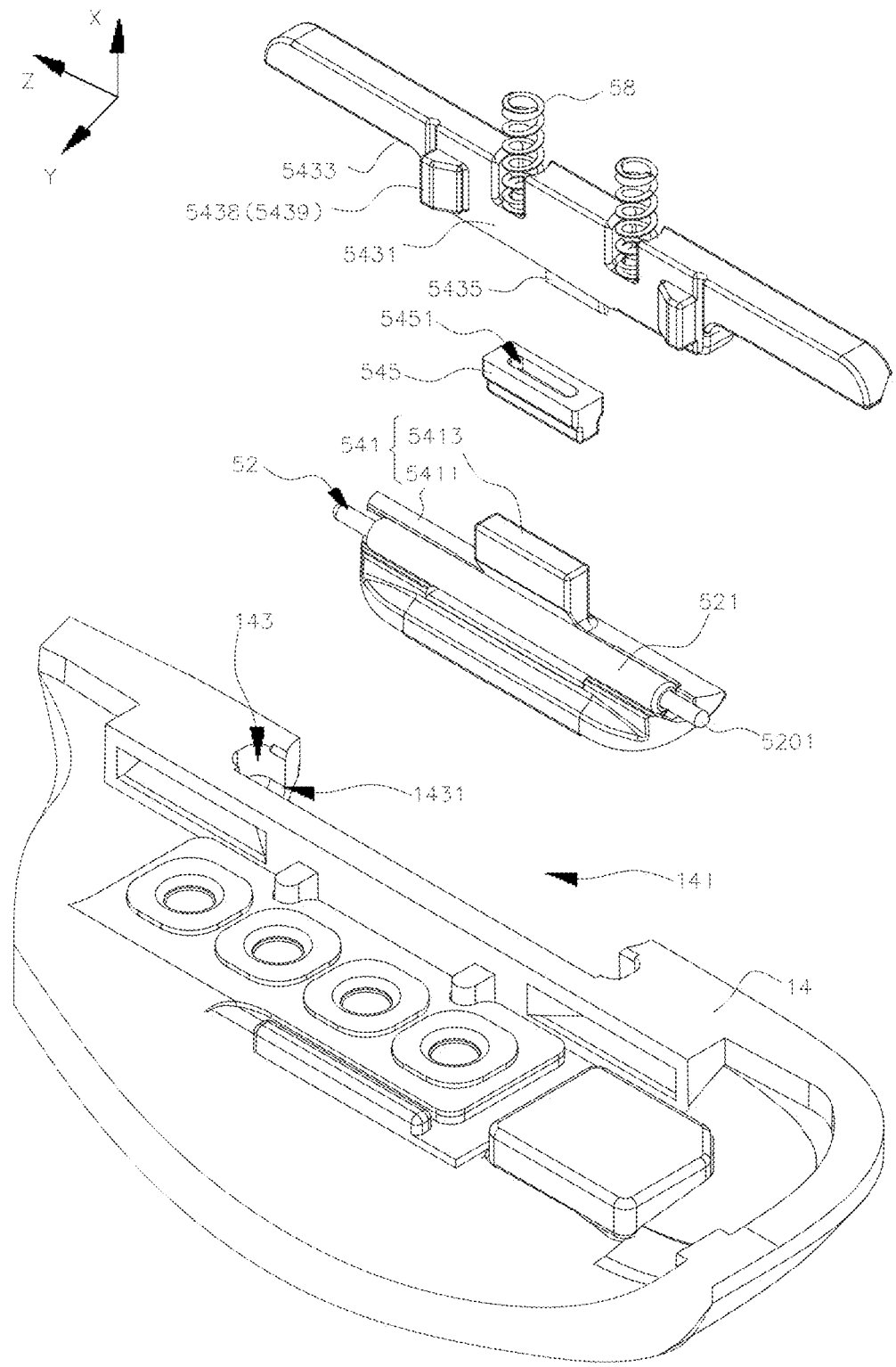
FIG. 12 is an exploded view illustrating the connecting assembly and the first structural body illustrated in FIG. 11, from another perspective.

In order to effectively position the pressing portion 5411, a positioning connection member mating with the position-limiting portion 143 may be provided to enable the pressing portion 5411 to be positioned in the housing 14 of the first structural body 10. For example, as illustrated in FIG. 11, in some embodiments, the connecting assembly 50 may further include an elastic connection member 52. The elastic connection member 52 is connected to the pressing portion 5411, and is configured to mate with the position-limiting portion 143 of the housing 14 to position the pressing member 541. The elastic connection member 52 is provided in the first mounting portion 101, and in the first position, the elastic connection member 52 limits the movement range of the pressing member 541. Further, as illustrated in FIG. 11 and FIG. 12, the elastic connection member 52 is provided with a positioning portion 5201, and the positioning portion 5201 is configured to mate with the position-limiting portion 143, to enable the pressing member 541 to perform limited movement (for example, move in the first direction X) in the accommodating groove 141. In the process of mounting the pressing member 541 to the accommodating groove 141, the elastic connection member 52 is capable of being squeezed and deformed by the side wall of the accommodating groove 141, until the positioning portion 5201 is accommodated in the position-limiting portion 143 to mate therewith, so as to define the position of the pressing member 541 relative to the first structural body 10.

In the embodiments of the present disclosure, the deformation form of the elastic connection member 52 is not limited. For example, the elastic connection member 52 itself may be elastically deformed (for example, the elastic connection member 52 itself is an elastic structural body or made of an elastic material), so that the positioning portion 5201 may deform or/and extend-retract relative to the pressing member 541, to facilitate disassembly and assembly. For another example, the elastic connection member 52 may include an elastic structural body, and through deformation of the elastic structural body, the positioning portion 5201 can deform or/and extend-retract relative to the pressing member 541, to facilitate disassembly and assembly. In the embodiment, the elastic connection member 52 itself is in a telescopic structure, and through the deformation generated by the extending or retraction of the telescopic structure, the positioning portion 5201 can extend or retract relative to the pressing member 541 to facilitate disassembly and assembly.

In the embodiment illustrated in FIG. 11 and FIG. 12, the elastic connection member 52 includes a fixing portion 521. The fixing portion 521 is fixedly connected to the pressing portion 5411 of the pressing member 541 (for example, the pressing portion 5411 may be provided with a receiving groove for receiving the fixing portion 521). The positioning portion 5201 is movably connected to the fixing portion 521, and may protrude relative to the pressing portion 5411. During the process of mounting the pressing member 541 to the accommodating groove 141, the positioning portion 5201 can be squeezed by the side wall of the accommodating groove 141 to retract relative to the fixing portion 521, and can extend out relative to the fixing portion 521 to mate with the position-limiting portion 143, to define the position of the pressing member 541 relative to the first structural body 10. Further, the positioning portion 5201 is movably accommodated in the position-limiting portion 143 of the housing 14, in such a manner that the key 54 can move in the accommodating groove 141 along the first direction X. In the embodiment, the positioning portion 5201 is a protrusion structure, and the position-limiting portion 143 mating with the positioning portion 5201 is a groove structure, and the two are hold together through engagement. It is understandable that, the expressions "hold", "engage" or "clamp" in the present disclosure should be understood as that two parties mating with each other may be provided with corresponding receiving and inserting structures (such as the groove structure and the protrusion structure engaged with each other as mentioned above), or a clamping structure, etc., and it does mean that the two parties mating with each other need to get stuck to each other by means of an external force.

Figure 13:
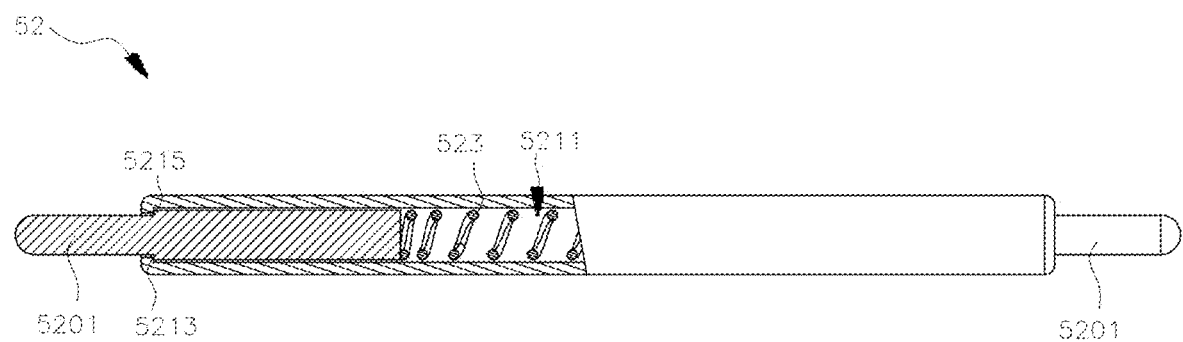
FIG. 13 is a partial cross-sectional view illustrating an elastic connection member of the locking structure illustrated in FIG. 11.

As illustrated in FIG. 12 and FIG. 13, in the present embodiment, the fixing portion 521 is substantially rod-shaped, and is provided with an accommodating cavity 5211 for accommodating the positioning portion 5201. The accommodating cavity 5211 may be provided along a length direction of the fixing portion 521, and run through two opposite ends of the fixing portion 521. There may be two positioning portions 5201, and the two positioning portions 5201 may be provided at two opposite ends of the accommodating cavity 5211 respectively, and both of them may extend out of the fixing portion 521 through the accommodating cavity 5211, to protrude relative to both ends of the pressing portion 5411 respectively, thereby mating with the two position-limiting portions 143. Further, the elastic connection member 52 may further include an elastic portion 523 provided between the two positioning portions 5201, to provide, to the positioning portion 5201, a supporting force that enables the positioning portion 5201 to extend out of the fixing portion 521. Further, a position-limiting boss 5213 is provided within in the accommodating cavity 5211 of the fixing portion 521, and the position-limiting boss 5213 may be provided at an end position of the accommodating cavity 5211. A position-limiting flange 5215 may be provided at the positioning portion 5201. The position-limiting flange 5215 is accommodated in the accommodating cavity 5211, and is arranged opposite to the position-limiting boss 5213. When the position-limiting flange 5215 abuts against the position-limiting boss 5213, the position-positioning portion 5201 arrives at its extreme position for extending out from the fixed portion 521, to prevent the positioning portion 5201 from falling off the fixing portion 521.

Since the first structural body 10 is the main supporting structure for mounting the connecting assembly 50, other details of the first structural body 10 will be described below according to some embodiments of the present disclosure.

Figure 14:
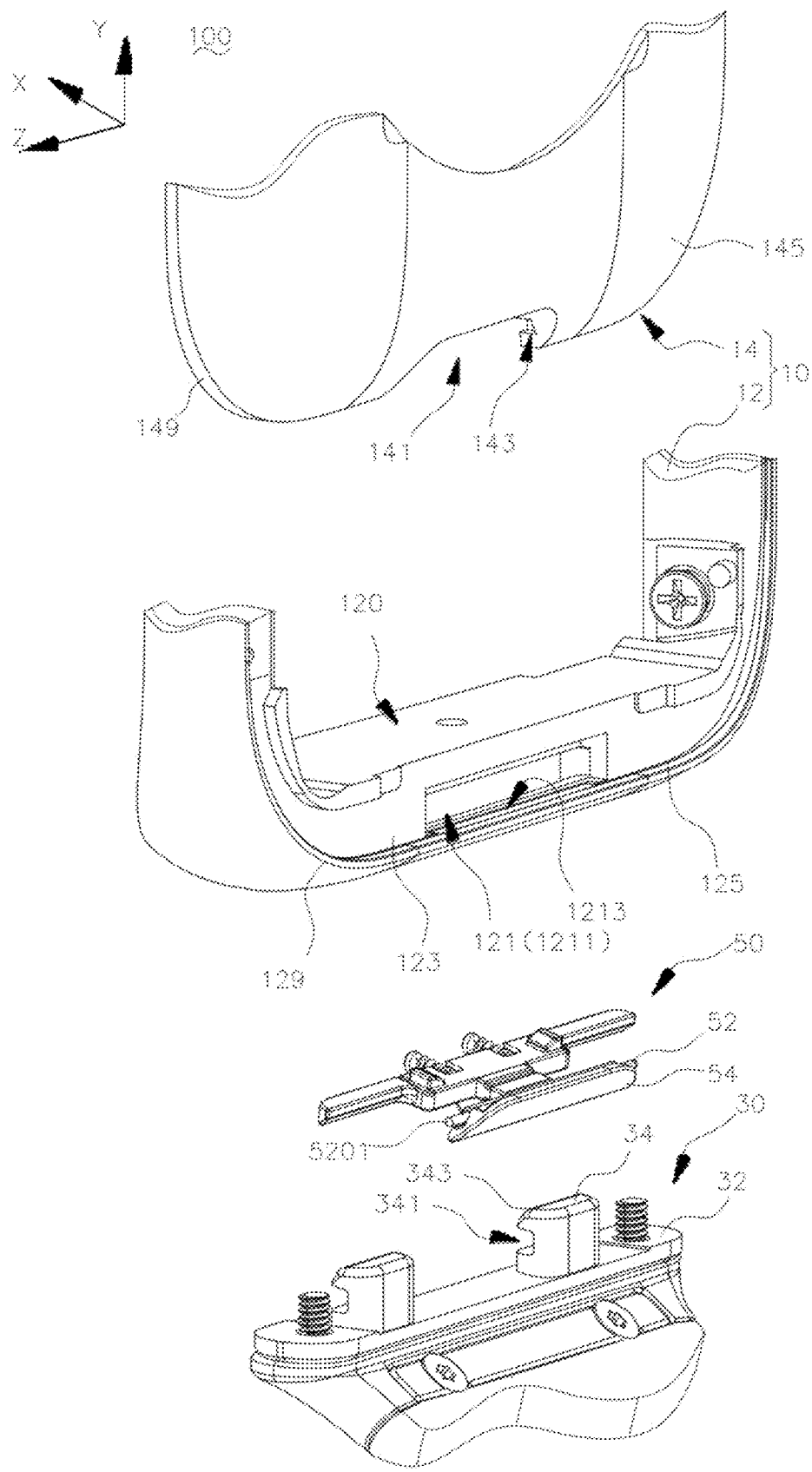
FIG. 14 is an exploded view illustrating the locking structure illustrated in FIG. 1 from a second perspective.

As illustrated in FIG. 13 and FIG. 14, the middle frame 12 includes a main body portion 120, and the main body portion 120 forms a main supporting structure of the first structural body 10. The main body portion 120 may be substantially in a shape of a rectangular frame, a round frame, or an oval frame, or in other irregular geometric shapes or irregular shapes, which is not limited in the present disclosure. The main body portion 120 includes a bearing surface 123 and a side surface 125 connected to the bearing surface 123, where the bearing surface 123 is configured to bear the housing 14. In this embodiment, an orientation of the bearing surface 123 is different from an orientation of the side surface 125. Further, the bearing surface 123 is substantially perpendicular to the first direction X, and the side surface 125 is substantially perpendicular to the second direction Y. The bearing surface 123 and the side surface 125 may be planar or curved surfaces, or may be planar or curved surfaces with grooves or/and protrusions, which is not limited in the present disclosure. The receiving space 121 of the middle frame 12 is provided inside the main body portion 120, and runs through the bearing surface 123 and the side surface 125. The receiving space 121 runs through the bearing surface 123 to define a first opening 1211, and the first opening 1211 is configured to mount and accommodate the key 54. The receiving space 121 runs through the side surface 125 to define a second opening 1213, and the second opening 1213 is configured to mount the locking portion 34 of the second structural body 30. For example, in the process of mounting the second structural body 30 to the first structural body 10, the locking portion 34 may pass through the second opening 1213 so as to be engaged with the clamped member 543 in the receiving space 121. In the embodiment, the orientation of the first opening 1211 is substantially consistent with the first direction X, and the orientation of the second opening 1213 is substantially consistent with the second direction Y, for example it is substantially perpendicular to the orientation of the first opening 1211.

Figure 15:
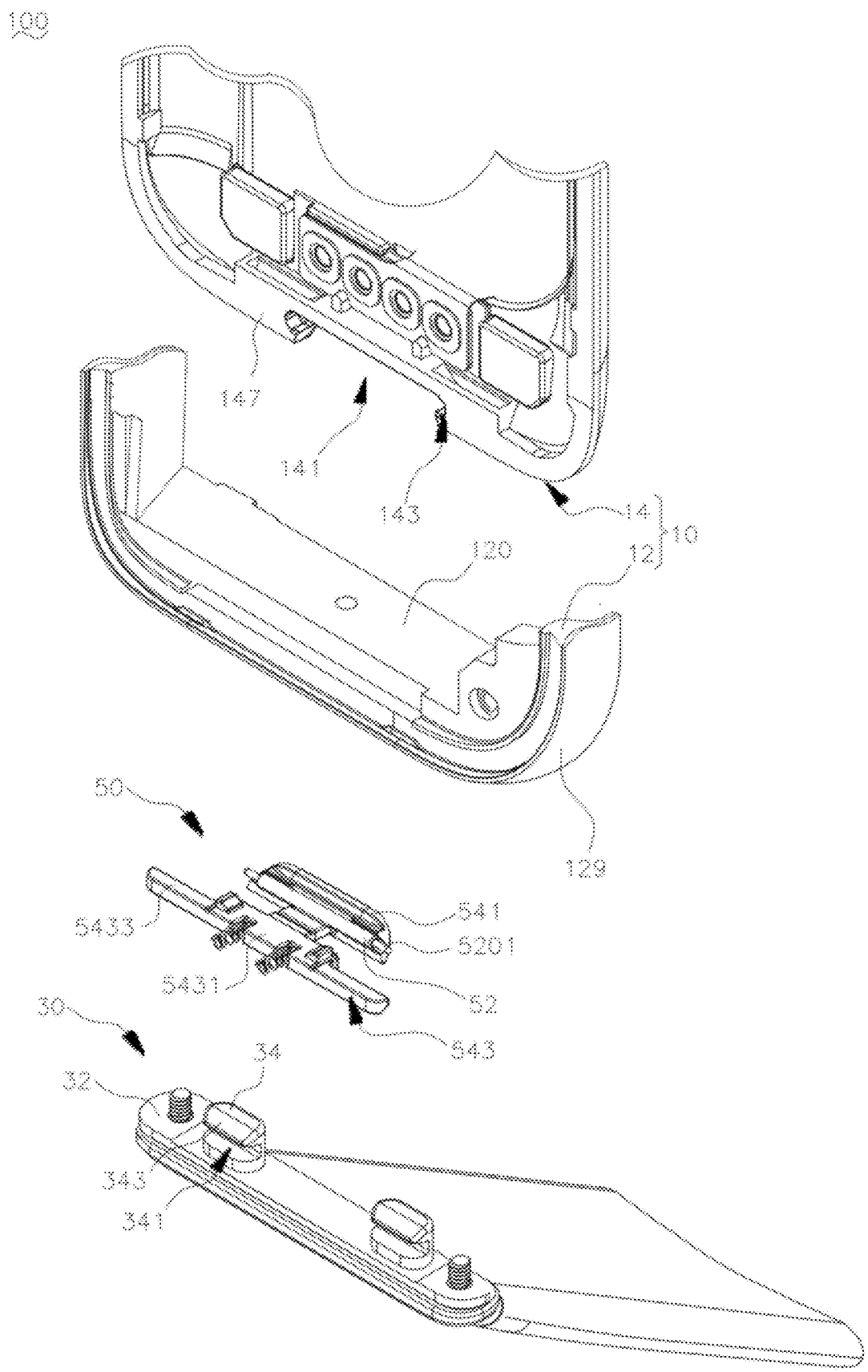
FIG. 15 is an exploded view illustrating the locking structure illustrated in FIG. 1 from a third perspective.

As illustrated in FIG. 14 and FIG. 15, in some embodiments, the middle frame 12 may further include a boundary portion 129. The boundary portion 129 is provided on a side of the main body portion 120, and is configured to cover the main body portion 120, and define an appearance surface of the locking structure 100 together with the housing 14. In the embodiment, the boundary portion 129 may be covered on the side surface 125 of the main body portion 120, and partially cover the second opening 1213 so as to prevent too much exposure of the second opening 1213 to the external environment; this is beneficial to enable an excellent dust-proof performance of the locking structure 100, and can also reduce the number or/and area of the openings provided in the appearance surface of the locking structure 100, so as to improve the consistency of the appearance structure. Further, the boundary portion 129 may be provided with a through hole 1291 communicated with the second opening 1213, where the size of the through hole 1291 is smaller than the size of the second opening 1213, and the through hole 1291 is configured to allow the locking portion 34 of the second structural body 30 to pass therethrough. Further, when the boundary portion 129 is covered the side surface 125 of the middle frame 12, at least part of the boundary portion 129 is arranged opposite to the side wall surface 149 of the housing 14, so that the boundary portion 129 may cover an opening part of the notch structure of the accommodating groove 141, thereby limiting the degree of freedom of movement of the key 54 in the second direction Y, thereby preventing the key 54 from falling off from the opening part, where the second direction Y may intersect with the first direction X (for example, the two are substantially perpendicular to each other).

Further, in the embodiment, when the boundary portion 129 is provided on a side of the side surface 125, the boundary portion 129 may protrude relative to the bearing surface 123, so as to be arranged opposite to the side wall surface 149 of the housing 14. As such, when the housing 14 is covered on the bearing surface 123, the protruding part of the boundary portion 129 and the side wall surface 149 which are arranged opposite to each other may enable the middle frame 12 and the housing 14 to be tightly combined with each other, thereby ensuring an excellent sealing effect enabling waterproof and dustproof of the first structural body 10. In some embodiments, the material of the boundary portion 129 may be different from the material of the main body portion 120. For example, the boundary portion 129 and the main body portion 120 may be produced through processing such as double color injection or insert molding, and connected with each other. The boundary portion 129 may substantially cover the side surface 125, or may be connected to only one side of the side surface 125 or connected to only the bearing surface 123, and protrude relative to the bearing surface 123, which is not limited in the present specification.

When the housing 14 is covered on the bearing surface 123, the accommodating groove 141 is arranged substantially opposite to the first opening 1211 of the middle frame 12.

As illustrated in FIG. 14 and FIG. 15, the position-limiting portion 143 is provided adjacent to the accommodating groove 141, and is configured to define the position of the elastic connection member 52, so as to define a relative position of the pressing member 541 in the accommodating groove 141. In the embodiment illustrated in FIG. 14 and FIG. 15, the position-limiting portion 143 is generally a groove structure, and is configured to accommodate the positioning portion 5201 of the elastic connection member 52. The specific arrangement position of the position-limiting portion 143 is not limited, and in the embodiment illustrated in FIG. 14 and FIG. 15, the position-limiting portion 143 may be provided on a side wall of the accommodating groove 141, and extend to a surface of the housing 14 facing towards the middle frame 12. There may be two position-limiting portions 143, and the two position-limiting portions 143 may be respectively provided at two opposite ends of the receiving groove 141. In other embodiments, the position-limiting portion 143 may be provided at other positions. For example, the position-limiting portion 143 may be provided on an inner wall of the accommodating groove 141 without extending to the inner surface 147 of the housing 14, and in this case, the position-limiting portion 143 may be a structure such as a hole or a groove in an inner wall of the accommodating groove 141. For another example, the position-limiting portion 143 may be provided at the inner surface 147 of the housing 14, without being communicated with the accommodating groove 141; and in this case, the position-limiting portion 143 may be a structure such as a hole or a groove provided in the inner surface 147, and correspondingly, the elastic connection member 52 is also provided at an end of the pressing member 541. For example, the positioning portion 5201 of the elastic connection member 52 may protrude relative to the pressing portion 5411 and be bent, so as to mate with the position-limiting portion 143.

In some embodiments, as illustrated in FIG. 8 and FIG. 11 again, the housing 14 may further include a projection 148. The projection 148 is provided in the accommodating groove 141, and projects out relative to a side wall of the accommodating groove 141. The projection 148 may be provided on a side of the accommodating groove 141 close to the middle frame 12, and arranged opposite to at least part of the key 54, to define a position to which the key 54 moves in the accommodating groove 141 along the first direction. Specifically, if the position-limiting portion 143 is a groove and the groove has a bottom wall 1431 opposite to the middle frame 12 (see FIG. 12), when the pressing member 541 is provided in the receiving groove 141 and the positioning portion 5201 is accommodated in the groove of the position-limiting portion 143, the positioning portion 5201 is arranged opposite to the bottom wall 1431, and the bottom wall 1431 of the groove is configured to define a position to which the positioning portion 5201 and the pressing member 541 move in an opposite direction to the first direction X. The projection 148 is arranged opposite to at least part of the pressing member 541, to define a position to which the pressing member 541 moves in the first direction X. That is, the projection 148 and the bottom wall 1431 of the groove limit the range of movement of the pressing member 541 in the first direction X, which is beneficial to ensure a strong structural stability of the locking structure 100.

As illustrated in FIG. 15 again, the second structural body 30 is detachably connected to the first structural body 10. The main body 32 of the second structural body 30 may be provided on a part to which the main body 32 needs to be connected, or may be an integral part of this part. For example, when the locking structure 100 is applied to a smart watch, the main body 32 may be provided on a watch strap of the smart watch, or may be a part of the structure of the watch strap.

Figure 16:
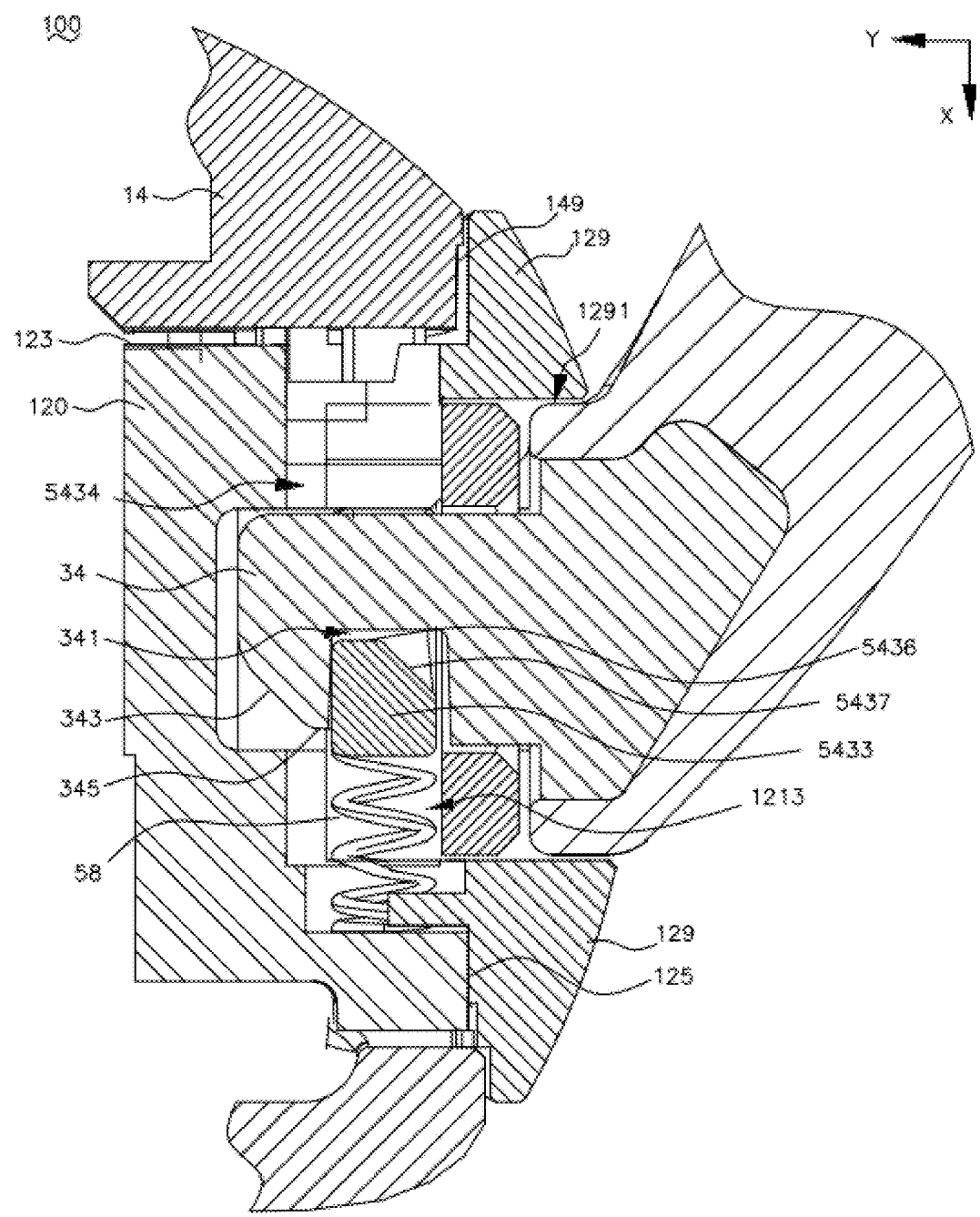
FIG. 16 is another cross-sectional view illustrating the locking structure illustrated in FIG. 1.

As illustrated in FIG. 16, the locking portion 34 of the second structural body 30 is provided at an end of the main body 32, and protrudes relative to a surface of the main body 32. When the second structural body 30 is connected to the first structural body 10, the locking portion 34 is located on a side of the main body 32 facing towards the first structural body 10. The locking portion 34 is substantially hook shaped, for mating with the clamped member 543. Specifically, in the embodiment illustrated in FIG. 16, the locking portion 34 is provided with a locking groove 341. The locking groove 341 is configured to receive a part of the structure of the clamped member 543, to enable clamping between the locking portion 34 and the clamped member 543. Further, the locking portion 34 may be a columnar structure provided on a surface of the main body 32, and the locking groove 341 is provided on a peripheral wall of the columnar structure. A side of the locking portion 34 away from the main body 32 may further be provided with a first guiding slope 343, and the first guiding slope 343 and the locking groove 341 are located on the same side of the column structure. The slope direction of the first guiding slope 343 intersects with an axis direction of the columnar structure, and is used to guide a movement direction of the locking portion 34 at the time of inserting the locking portion 34 into the second opening 1213, and guide the locking portion 34 to be engaged with the clamped member 543.

In the embodiments of the disclosure, the number of the locking portions 34 is not limited, and there may be one or more locking portions; and correspondingly, there may also be one or more clamped portions 5433 for the clamped member 543 that are in a one-to-one correspondence to the locking portions 34, which is not limited in the present disclosure. In the embodiment illustrated in FIG. 14, FIG. 15 and FIG. 16, there are two locking portions 34, and the two locking portions 34 are arranged on the main body 32 in such a manner that they are spaced apart from each other, to enhance the stability of the clamping structure between the second structural body 30 and the clamped member 543. Correspondingly, there may also be two clamped portions 5433 for the clamped member 543, and the two clamped portions 5433 are respectively provided at two opposite ends of the abutting portion 5431, and are provided in one-to-one correspondence with the two locking portions 34. When the locking portion 34 is inserted into the clamping space 5434, the clamped portion 5433 is at least partially accommodated in the locking groove 341, so that the second structural body 30 is connected to the first structural body 10. When the second structural body 30 needs to be detached, an external force is applied on the pressing member 541 in the first direction X, and the pressing member 541 pushes the clamped portion 5433 to move along the first direction X so as to be disengaged from the locking groove 341, and then the second structural body 30 is pulled out so as to be separated from the first structural body 10; at that time, the pressing member 541 and the clamped member 543 of the key 54 return to their original positions under the action of the restoring member 58. When the second structural body 30 needs to be connected to the first structural body 10, the locking portion 34 is inserted along the second direction Y into the clamping space 5434 from the second opening 1213, and the first guiding slope 343 of the locking portion 34 abuts against the clamped portion 5433 and gradually goes into the clamping space 5434; in addition, the clamped portion 5433 moves along the first direction X under the pushing of the locking portion 34 to cause the position-restoring member 58 to generate compression deformation, and when the clamped portion 5433 moves to a position where the clamping groove 341 is directly opposite to the clamped portion 5433, the clamped portion 5433 is pushed into the locking groove 341 under the action of the elastic restoring force of the position-restoring member 58, at that time, the clamped portion 5433 and the locking portion 34 are engaged. In the above detachment and installation processes, the second structural body 30 can be simply and conveniently mounted and detached. Further, in some embodiments, the clamped portion 5433 may also be provided with a second guiding slope 5437 corresponding to the locking portion 34, and the second guiding slope 5437 may be provided on a side of the clamped portion 5433 facing towards the main body 32 of the second structural body 30. For example, in the process of mounting the second structural body 30 to the first structural body 10, the locking portion 34 abuts against the guiding slope of the clamped member 543 to drive the clamped member 543 to move relative to the second mounting portion 103. The second guiding slope 5437 is configured to mate with the first guiding slope 343, to improve fluency of the movement of inserting the locking portion 34 into the clamping space 5434. In some embodiments, at least one of the clamped portion 5433 and the locking portion 34 is provided with a guiding slope.

In the embodiment, a first transition surface 345 is provided between the first guiding slope 343 and the locking groove 341 of the locking portion 34, and the first transition surface 345 may be a planar or cambered surface. In the process of mounting the locking portion 34 of the second structural body 30 into the second mounting portion 103, after the first guiding slope 343 drives the clamped member 543 to move and it moves to the position of the clamped member 543, the locking portion 34 may continue moving a certain distance towards the inside of the locking structure 100. In this process, the first guiding slope 343 leaves the second guiding slope 5437, and the clamped portion 5433 of the clamped member 543 abuts against the first transition surface 345 and the first transition surface 345 moves relative to the clamped portion 5433, until the clamped portion 5433 is separated from the first transition surface 345 and enters the locking groove 341 of the locking portion 34; in addition, the clamped member 543 may be driven to move along a direction towards the pressing member 541, and the locking groove 341 may be utilized to limit the position of the clamped portion 5433, to prevent the second structural body 30 from falling out of the first structural body 10. For example, in the embodiment, a surface of the locking groove 341 facing away from the first guiding slope 343 is planar, and is substantially perpendicular to the movement direction of the locking portion 34. For example, the surface of the locking groove 341 facing away from the first guiding slope 343 or the surface of the locking groove 341 facing towards the main body 32 may be planar, and defines an included angle of 85 degrees to 90 degrees with regard to the movement direction of the latching portion 34. Thus, the position of the locking portion 34 can be effectively limited by the clamped portion 5433, so as to prevent the second structural body 30 from being easily disengaged from the first structural body 10 when the second structural body 30 is pulled.

Certainly, a surface of the clamped portion 5433 facing away from the second guiding slope 5437 may also be planar, and is substantially perpendicular to the movement direction of the locking portion 34. For example, the surface of the clamped portion 5433 facing away from the second guiding slope 5437 may also be planar, and defines an included angle of 85 degrees to 90 degrees with regard to the movement direction of the locking portion 34. Thus, the position of the locking portion 34 can be effectively limited by the clamped portion 5433, so as to prevent the second structural body 30 from being easily disengaged from the first structural body 10 when the second structural body 30 is pulled.

A side of the clamped portion 5433 facing towards the pressing member 541 may be provided with a second transition surface 5436, and the second transition surface 5436 may be a planar or cambered surface. During the process of mounting the second structural body 30 into the first structural body 10, after the first guiding slope 343 leaves the second guiding slope 5437, the locking portion 34 may abut against the second transition surface 5436 and continue moving towards the inside of the electronic device 500 along the second transition surface 5436, until the locking portion 34 leaves the second transition surface 5436. For example, in the embodiment in which the locking portion 34 is provided with the first transition surface 345, after the first transition surface 345 leaves the second transition surface 5436, the clamped member 543 may enter the locking groove 341 to enable the locking portion to mate with the clamped portion 5433, that is, to enable the second structural body 30 to be confined at the first structural body 10.

The first transition surface 345 may enhance the structural strength of the locking portion 34 at the edge of the locking groove 341. The second transition surface 5436 may enhance the strength of the clamped portion 5433 at the edge of the second guiding slope 5437. It is understandable that the first transition surface 345 and the second transition surface 5436 are not necessary. For example, in a case where both the first transition surface 345 and the second transition surface 5436 are absent, after the first guiding slope 343 leaves the second guiding slope 5437, the clamped member 543 may enter the locking groove 341 of the locking portion 34, and mate with the locking portion 34 for position limiting. In other words, at least one of the first transition surface 345 and the second transition surface 5436 may be absent.

It is understandable that, in the above embodiments, the first position and the second position may be regarded as extreme positions of the pressing member 541 during movement, and a third position and a fourth position may be regarded as extreme positions of the clamped member 543 during movement. These positions are only introduced to serve as a reference for movement, to clearly illustrate the positions of the pressing member 541, the locking portion 34, the clamped member 543 relative to the first structural body 10 during the process of mounting the second structural body 30 to the first structural body 10, and these positions may not be uniquely determined. For example, in the case of engineering errors, these positions should be within a suitable area on the first structural body 10, and should not be construed as strictly limiting the technical solutions.

For example, when the second structural body 30 is not mounted to the electronic device 500, or the second structural body 30 has already been mounted to the electronic device 500 and may be normally used, it may be considered that the pressing member 541 is located at the first position. Normally, the pressing member 541 cannot move towards the outside of the electronic device 500 along the first direction. For another example, the first structural body 10 may be provided with a position-limiting structure, and in the second position, the pressing member 541 abuts against the position-limiting structure. Normally, the pressing member 541 cannot continue moving towards the inside of the electronic device 500 along the first direction, thereby preventing the pressing member 541 from being excessively pressed and damaged. The first structural body 10 may be provided with corresponding position-limiting structures, so that the pressing member 541 abuts against such position-limiting structures in the first position and the second position respectively, and thus the first position and the second position mentioned above may be determined.

Certainly, the first position and the second position may be determined in other ways. For example, in the above embodiments, when the pressing member 541 is in the first position, the end surface of the pressing member 541 exposed from the housing 14 is flush with the end surface of the housing 14 at the key groove 1011, and such appearance characteristic may be used to determine the first position of the pressing member 541. For another example, when the pressing member 541 is pressed to enable the second structural body 30 to be detached from the first structural body 10, it may be considered that the pressing member 541 is located at the second position.

Similarly, the third position and the fourth position may also be determined in multiple ways. For example, when the second structural body 30 is not mounted to the electronic device 500, or the second structural body 30 has already been mounted to the electronic device 500 and may be normally used, it may be considered that the clamped member 543 is located at the third position. Normally, the pressing member 541 cannot move along the first direction to get closer to the pressing member 541. In the process of mounting the second structural body 30 to the first structural body 10, another extreme position of the movement of the clamped member 543 along the first direction is the fourth position. If the clamped member 543 is fixed at the fourth position relative to the first structural body 10, the locking portion 34 of the second structural body 30 can smoothly get in and out the groove 1031. For another example, in the aforementioned embodiment, the third position and the fourth position may also be determined through the mating of the protrusion 5439 of the clamped member 543 and the holding hole 127.

In the locking structure provided by the embodiments of the present disclosure, the key is configured to be connected between the first structural body and the second structural body. While the key is provided at the first structural body, the clamped member of the key can be engaged with the locking portion of the second structural body. By making the clamped member movably engaged with the locking portion, the second structural body can be conveniently connected to and detached from the first structural body. For example, in the process of mounting the second structural body to the first structural body, the clamped member is driven by the locking portion to move relative to the first structural body, and is restored so as to be engaged with the locking portion; as such, the second structural body is enabled to be conveniently mounted to the first structural body. For another example, in the process of detaching the second structural body from the first structural body, the pressing member can be pressed to drive the clamped member to move so as to be disengaged from the locking portion; as such, the second structural body is enabled to be conveniently detached from the first structural body. When the locking structure is applied to a smart wearable device, a detachable connection of the device body with a wearable part can be conveniently achieved by means of the key structure.

Further, in the above locking structure, the pressing member and the clamped member of the key are positioned at the first structural body through the first mounting portion and the second mounting portion, respectively. The pressing member and at least partial structure of the clamped member are arranged opposite to each other, and the pressing member can be pressed and drive the clamped member to move. Thus, transmission of movement is enabled between the pressing member and the clamped member by means of the opposite position relationship thereof, and the positioning and mounting of the pressing member can be are performed separately from the positioning and mounting of the clamped member. This avoids a fitting issue in installation that is caused due to a too long dimension chain generated when the pressing member and the clamped member are fixedly connected through other fastening structures. In this way, the key is designed as a pressing member and a clamped member which are substantially separated, which breaks the original dimension chain of the key. In addition, there is no longer a dimension chain for assembly between the pressing member and the clamped member, and the pressing member and the clamped member may be respectively provided at the first mounting portion and the second mounting portion of the first structural body. There is thus a short dimension chain generated when the key is mounted onto the first structural body, which reduces the difficulty of producing and assembling the locking structure. When the locking structure is applied to a smart wearable device or/and a smart watch, it is beneficial to improve the accuracy installation of the key, and ensure the yield of installation of the parts as well as the appearance consistency for the smart wearable device or the smart watch.

Based on the foregoing locking structure, an embodiment of the present disclosure further provides a smart wearable device. The smart wearable device provided in the embodiment of the present disclosure is a portable device that is directly worn on a person or integrated into clothing or accessories of a user. The smart wearable device may include, but is not limited to, a watch, a smart bracelet, a smart wristband, smart glasses, a finger ring, a helmet, and the like. For ease of explanation, it is illustrated in detail below by taking a smart watch as an example. The watch strap provided by the embodiments of the present disclosure may be adaptively adjusted according to different positions where the wearable device is worn.

As illustrated in FIG. 17, an embodiment of the present disclosure provides an electronic device 500 having a locking structure 100. The electronic device 500 includes a first structural body 10 and electronic components, such as a circuit board (not shown) and a battery (not shown), provided on the first structural body 10. The first structural body 10 may include a middle frame 12 and a housing 14 connected to the middle frame 12. The middle frame 12 and the housing 14 together enclose a receiving space 131. The receiving space 131 is configured to receive the electronic components such as the circuit board and the battery of the electronic device 500. After the electronic device 500 is worn on the wrist of the user, at least part of the surface of the housing 14 is attached to the wrist of the user. The middle frame 12 may be made of a non-metal material such as plastic, rubber, silicon, wood, ceramic or glass, and the middle frame 12 may also be made of a metal material such as stainless steel, aluminum alloy or magnesium alloy. The middle frame 12 may also be a metal injection molded part, that is, a metal material is used to ensure the structural rigidity of the middle frame 12, and a mounting and positioning structure, such as a protrusion, a groove or a threaded hole, may be provided on the inner surface of the metal body through injection molding. The housing 14 may be made from a glass or ceramic or plastic material, and the material of the housing 14 may be the same as or different from that of the middle frame 12. In some embodiments, the middle frame 12 may be integrally formed with the housing 14.

Figure 18:
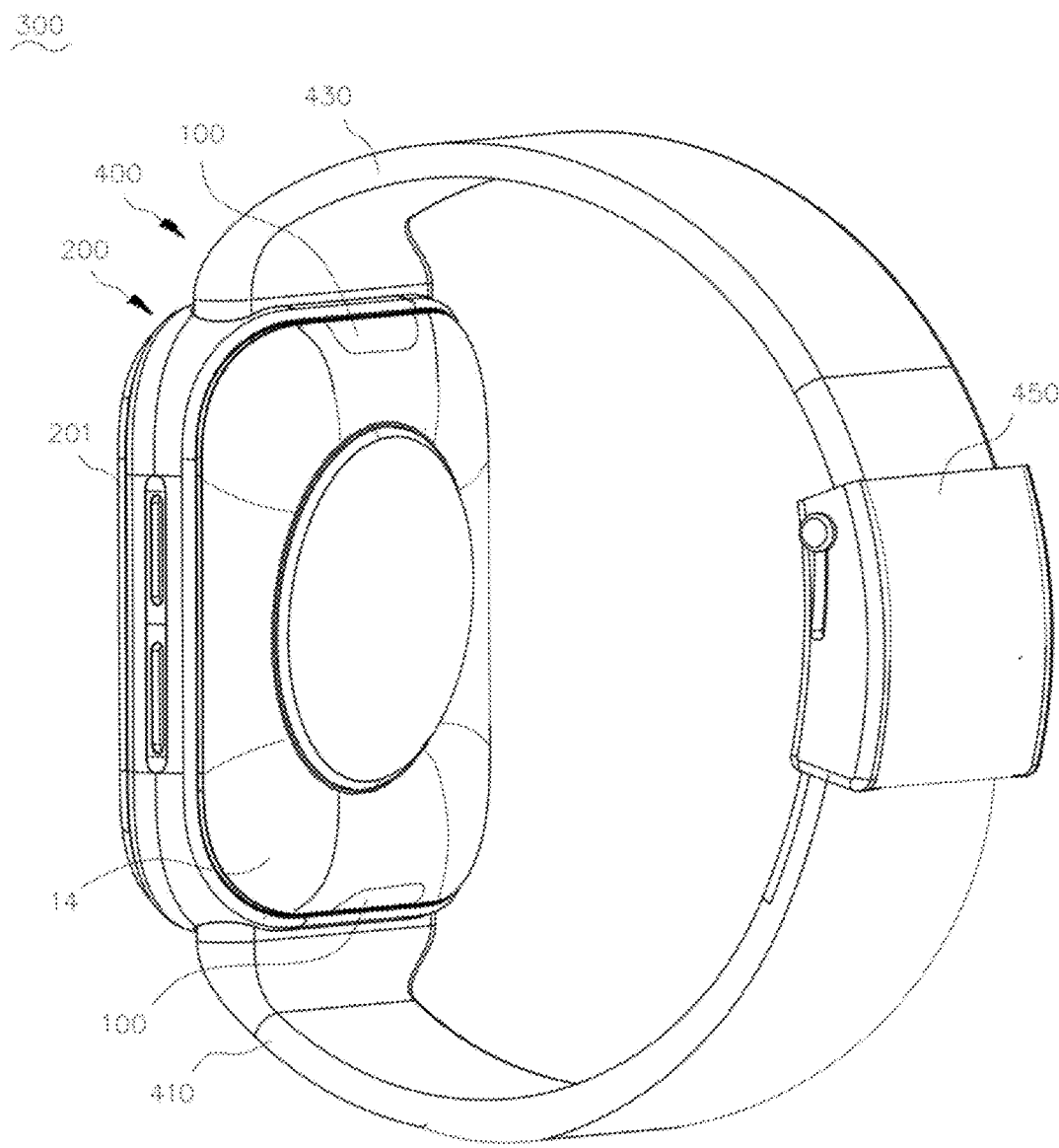
FIG. 18 is a schematic perspective view illustrating a smart wearable device according to an embodiment of the present disclosure.

As illustrated in FIG. 18, an embodiment of the present disclosure provides a smart wearable device 300 having a locking structure 100. The smart wearable device 300 may be, but is not limited to, a watch, a smart bracelet, a smart wristband, smart glasses, a finger ring, a helmet or other smart wearable devices. The smart wearable device 300 of the present embodiment is described by taking a smart watch as an example, and the locking structure 100 is described by taking a connection structure between the watch strap and the watch body of the smart watch as an example. The smart wearable device 300 includes a device body 200, a locking structure 100, and a wearable part. The wearable part 400 is connected to two sides of the device body 200 through the locking structure 100 for the user to wear.

In this embodiment, the device body 200 is a watch body, and the watch body may be a main body capable of implementing a function of a smart watch. The first structural body 10 of the lock structure 100 is provided at the device body 200. The device body 200 may include a display screen 201. The display screen 201 is connected to the housing 14, and a cavity is defined jointly by the display screen 201 and the housing 14. Components such as a chip, a sensor, and a battery may be provided inside the cavity.

The sensor includes, but is not limited to, a temperature sensor capable of detecting a body temperature, a vibration sensing sensor or a photoelectric sensor capable of detecting heart rate, or a pressure sensor for detecting blood pressure, and the like, so that the sensor can detect various health indicators of the wearer's body, such as the heart rate, body temperature or blood pressure. The sensor may also include an image sensor, a visible light sensor, an infrared light sensor, or the like. The chip may include one or more processing units, for example: an Application processor (AP), a modem processor, a memory, a Digital signal processor (DSP), a baseband processor, and/or a Neural-network processing unit (NPU). The display screen 201 may be a Liquid Crystal Display (LCD) or an Organic Light-Emitting Diode (OLED) display. The display screen 201 may be configured to display various information such as time, health indicators, and information. Certainly, the display screen 201 may be a touch screen, or an operating component such as a key may be provided on the display screen 201. The battery may supply power to components such as the display screen 201, the controller, and the processor. The battery includes, but is not limited to, a lithium battery, a dry battery, a storage battery, and the like.

In the embodiment of the present disclosure, the device body 200 may further include a wireless communications module. The wireless communications module may provide a solution for wireless communications applied to the smart watch, including a Wireless local area networks (WLAN), a Bluetooth (T), Frequency modulation (FM), an Infrared (IR) technique, or the like. The wireless communication module may implement a communication connection between the smart wearable device 300 and an external device, such as a mobile phone, or a computer.

The wearable part 400 is a structure for the user to wear. The second structural body 30 of the locking structure 100 is provided on the wearable part 400. In the embodiment, the wearable part 400 includes a first wearable part 410, a second wearable part 430 and a locking portion 450. The first wearable part 410 and the second wearable part 430 are respectively connected to two opposite sides of the device body 200 through the locking structure 100. The locking portion 450 is used to connect the first wearable part 410 and the second wearable part 430 together. As such, the first wearable part 410, the second wearable part 430 and the device body 200 together define a substantially annular structure for the user to wear. It is notable that, in the specification of the present disclosure, when one component is considered to be "provided at" another component, it may be connected to or directly provided at another component, or there may be a middle component (that is, the two components are indirectly connected). When one component is considered to be "connected to" another component, it may be directly connected to another component, or there may be a middle component, that is, the two components may be indirectly connected.

In the embodiments of the present disclosure, there are two wearable parts 400 (one of which is shown). Two opposite ends of the device body 200 each are provided with the groove 1031. Each of the two wearable parts 400 has one end thereof connected with the device body 200, and another end of each the two wearable parts 400, which is away from the device body 200, may be buckled to define a receiving space, so that the device body 200 may be worn to the wrist of the user through the wearable parts 400. In other embodiments, the wearable part 400 may be in a one-piece structure. One end of the wearable part 400 is connected to one end of the device body 200, the other end of the device body 200 may be provided with a retaining ring for the wearable part 400 to pass through, and the free end of the wearable part 400 may pass through and wound around the retaining ring, and then be fixed to another position of the wearable part 400 to define a receiving space. The size of the receiving space is easy to adjust, so as to facilitate the user to wear.

In the smart wearable device and the locking structure thereof provided by the embodiments of the present disclosure, the key is configured to be connected between the first structural body and the second structural body. While the key is provided at the first structural body, the clamped member of the key can be engaged with the locking portion of the second structural body. By making the clamped member movably engaged with the locking portion, the second structural body can be conveniently connected to and detached from the first structural body. For example, in the process of mounting the second structural body to the first structural body, the clamped member is driven by the locking portion to move relative to the first structural body, and is restored so as to be engaged with the locking portion; as such, the second structural body is enabled to be conveniently mounted to the first structural body. For another example, in the process of detaching the second structural body from the first structural body, the pressing member can be pressed to drive the clamped member to move so as to be disengaged from the locking portion; as such, the second structural body is enabled to be conveniently detached from the first structural body. When the locking structure is applied to the smart wearable device, a detachable connection of the device body with a wearable part can be conveniently achieved by means of the key structure.

Based on the above locking structure 100 and the smart wearable device 300, an embodiment of the present disclosure further provides a housing assembly (not shown in the figure). The housing assembly includes the housing 14, the middle frame 12, and the key 54 mentioned above. The housing 14 is provided with the first mounting portion 101, and the middle frame 12 is provided with the second mounting portion 103. The key 54 is connected to the middle frame 12, and is configured to connect the middle frame 12 and an external structure. The key 54 includes the pressing member 541 and the clamped member 543. The pressing member 541 is movably provided at the first mounting portion 101, and is configured to move relative to the first mounting portion 101 along a first direction under an external force. The clamped member 543 is movably provided at the second mounting portion 103 and is positioned at the middle frame 12 through the second mounting portion 103, and the clamped member 543 is configured to be engaged with an external structure (such as the locking portion 34). In the process of mounting the external structure to the middle frame 12, the external structure moves along the second direction to push the clamped member 543 to move relative to the middle frame along the first direction, and the clamped member can be restored so as to be engaged with the external structure. In the process of detaching the external structure from the middle frame 12, the pressing member 541 can be pressed to drive the clamped member 543 to move along the first direction so as to be disengaged from the external structure, where the first direction is different from the second direction. In this way, the middle frame 12, the housing 14, the pressing member 541 and the clamped member 543 can form a modular assembly, and when being applied, the modular assembly can be directly connected with other components of an actual application product, and the locking structure 100 can thus be assembled, which improves the assembly efficiency of the assembly. In other embodiments, the housing assembly may further include the features and structures introduced in any one of the above embodiments, and details thereof are not repeated here.

Based on the locking structure 100 and the smart wearable device 300 mentioned above, an embodiment of the disclosure further provides an electronic device. The electronic device may be, but is not limited to, a smart device such as a watch, a smart bracelet, a smart wristband, smart glasses, a finger ring, a helmet, or the like, or a smart portable communication device. The electronic device may be installed with a strap, and the strap may has any one of features of the second structural body provided in the above embodiments or a combination thereof, which will not be repeated here. The electronic device comprises a casing, a key and a clamped member. The casing may have any one of features of the first structural body provided in the foregoing embodiments or a combination thereof, and details thereof are not repeated here. The casing is provided with a first mounting portion and a second mounting portion communicated with each other. The key includes a pressing member and an elastic connection member. The elastic connection member is connected to the pressing member, and the pressing member is provided at the first mounting portion. The clamped member is provided at the second mounting portion. The assembling and positioning of the clamped member to the casing are performed separately from the assembling and positioning of the pressing member to the casing. The clamped member is used to mate with the strap, to make the strap confined at the casing. When the strap is confined at the casing, the elastic connection member abuts against the casing, so that the pressing member is confined at the casing. When the pressing member is pressed, the pressing member moves relative to the casing, and the pressing member drives the clamped member to move, so that the clamped member is disengaged from the strap, and the strap can be detached from the casing.

In this specification, specific features or characteristics described may be combined in any one or more embodiments or examples in a suitable manner. Furthermore, various embodiments or examples described in this specification, as well as features of different embodiments or examples, may be combined by those skilled in the art without contradiction. Finally, it is notable that the above embodiments are only used to describe the technical solutions of the present disclosure, rather than limiting such technical solutions. Although the present disclosure has been described in detail with reference to the foregoing embodiments, those skilled in the art will understand that they still can modify the technical solutions described in the foregoing embodiments, or equivalently substitute some of the technical features; however, such modifications or substitutions do not drive the essence of the corresponding technical solutions to depart from the spirit and scope of the technical solutions of the embodiments of present disclosure.

What is claimed is:

1. A locking structure, comprising:
   a first structural body, provided with a first mounting portion and a second mounting portion;
   a second structural body, comprising a main body and a locking portion protruding relative to the main body;
   a pressing member, wherein the pressing member is movably provided at the first mounting portion, and is configured to move relative to the first mounting portion under an external force; and
   a clamped member, wherein the clamped member is movably provided at the second mounting portion, and is positioned at the first structural body through the second mounting portion; the clamped member is configured to be engaged with the locking portion; and at least partial structure of the clamped member is arranged opposite to the pressing member;
   wherein in a process of mounting the second structural body to the first structural body, the clamped member is adapted to be driven by the locking portion to move relative to the second mounting portion, and be restored so as to be engaged with the locking portion; and in a process of detaching the second structural body from the first structural body, the pressing member is capable of being pressed to drive the clamped member to move, so as to make the clamped member disengaged from the locking portion.

2. The locking structure of claim 1, wherein one end of the pressing member is overlapped with the at least partial structure of the clamped member; and
   wherein the one end of the pressing member is arranged opposite to and spaced apart from the at least partial structure of the clamped member.

3. The locking structure of claim 2, wherein the locking structure further comprises a buffer component; the buffer component is provided between the pressing member and the clamped member, and is configured to push the clamped member to move when the pressing member is pressed;
   wherein one side of the buffer component is connected to one of the pressing member and the clamped member, and another side of the buffer component is spaced apart from the other one of the pressing member and the clamped member; or
   wherein one side of the buffer component is connected to one of the pressing member and the clamped member, and the other side of the buffer component is connected to the other one of the pressing member and the clamped member.

4. The locking structure of claim 3, wherein the buffer component is provided with a first connection portion, the clamped member is provided with a second connection portion, and the first connection portion and the second connection portion are adapted to mate with each other so as to fix the buffer component relative to the clamped member; one of the first connection portion and the second connection portion is a groove, and the other one of the first connection portion and the second connection portion is a protrusion capable of mating with the groove.

5. The locking structure of claim 1, wherein the first structural body is further provided with a position-limiting portion; the locking structure further comprises an elastic connection member connected to the pressing member, the elastic connection member is provided with a positioning portion, and the positioning portion is configured to mate with the position-limiting portion; and in a process of mounting the pressing member to the first mounting portion, the elastic connection member is capable of being squeezed and deformed by the first structural body, until the positioning portion and the position-limiting portion mate with each other to define a position of the pressing member relative to the first structural body.

6. The locking structure of claim 5, wherein the first mounting portion comprises an accommodating groove provided in the first structural body, the pressing member is movably accommodated in the accommodating groove, and the positioning portion and the position-limiting portion are adapted to movably mate with each other to enable the pressing member to move in the accommodating groove in a first direction; and in the process of mounting the second structural body to the first structural body, the locking portion is adapted to move in a second direction to drive the clamped member to move relative to the first structural body in the first direction; the first direction is perpendicular to the second direction.

7. The locking structure of claim 6, wherein the position-limiting portion is a groove, the groove has a bottom wall, and the positioning portion is accommodated in the groove and arranged opposite to the bottom wall; the first structural body is provided with a projection located in the accommodating groove, the projection is arranged opposite to at least part of the pressing member; and the bottom wall and the projection are configured to limit movement of the pressing member in the accommodating groove.

8. The locking structure of claim 5, wherein the elastic connection member further comprises a fixing portion, and the fixing portion is connected to the pressing member; the positioning portion is movably connected to the fixing portion, and is capable of protruding relative to the pressing member; in the process of mounting the pressing member to the first mounting portion, the positioning portion is capable of being squeezed by the first structural body to retract relative to the fixing portion, and is capable of extending out relative to the fixing portion to mate with the position-limiting portion, to define the position of the pressing member relative to the first structural body; and
   wherein the fixing portion is provided with an accommodating cavity, the positioning portion comprise two positioning portions, and the two positioning portions are respectively arranged at opposite ends of the accommodating cavity, and each of the two positioning portions is capable of extending out of the fixing portion through the accommodating cavity, to protrude relative to a perspective one of two ends of the pressing member; the elastic connection member further comprises an elastic portion, and the elastic portion is provided between the two positioning portions.

9. The locking structure of claim 1, wherein the locking structure further comprises a position-restoring member, and the position-restoring member is provided between the clamped member and the first structural body; and in the process of detaching the second structural body from the first structural body, the pressing member is capable of being pressed to drive the clamped member to move, and the position-restoring member is compressed to apply, to the clamped member, a supporting force towards the pressing member.

10. The locking structure of claim 9, wherein the pressing member comprises a pressing portion and a projecting portion; the pressing portion is provided at the first mounting portion; the projecting portion is connected to a side of the pressing portion facing towards the clamped member, and projects out relative to the pressing portion; the clamped member comprises an abutting portion and a clamped portion connected to the abutting portion; the abutting portion is spaced apart from or abuts against the projecting portion, and the clamped portion is spaced apart from the pressing portion; and when the second structural body is mounted to the first structural body, the locking portion is located between the clamped portion and the pressing portion and is engaged with the clamped portion; and wherein the locking portion is provided with a locking groove; in the process of mounting the second structural body to the first structural body, the clamped portion is adapted to be driven by the locking portion to move relative to the first structural body, and be restored so as to be at least partially accommodated in the locking groove, and be engaged with the locking portion; and in the process of detaching the second structural body from the first structural body, the pressing member is capable of being pressed to drive the clamped portion to be disengaged from the locking groove.

11. The locking structure of claim 9, wherein the position-restoring member comprises a first magnet and a second magnet, the first magnet is connected to the clamped member, and the second magnet is connected to the first structural body; and in a process of mounting the locking portion to the first structural body, the first magnet and the second magnet are adapted to approach each other and generate a magnetic repulsion force.

12. The locking structure of claim 10, wherein a side of the locking portion facing away from the main body is provided with a first guiding slope; and a side of the clamped portion is provided with a second guiding slope; and
wherein in the process of mounting the second structural body to the first structural body, the locking portion is adapted to push the second guiding slope of the clamped portion to drive the clamped member to move relative to the second mounting portion.

13. The locking structure of claim 1, wherein the first structural body comprises a middle frame and a housing, the housing is connected to the middle frame, the first mounting portion is provided at the housing, and the second mounting portion is provided at the middle frame;

wherein the housing comprises an outer surface and an inner surface facing away from each other, and a side wall surface connected between the outer surface and the inner surface; the first mounting portion comprises an accommodating groove provided in the housing, and the accommodating groove runs through the inner surface and the outer surface, and extends to the side wall surface; and wherein the pressing member is movably provided in the accommodating groove, and a surface of the pressing member is coplanar with the outer surface of the housing.

14. The locking structure of claim 13, wherein the second mounting portion comprises a receiving space provided in the middle frame; the middle frame comprises a bearing surface and a side surface connected with the bearing surface; the receiving space runs through the bearing surface to define a first opening, and runs through the side surface to define a second opening; the housing is covered on the bearing surface; the middle frame further comprises a boundary portion, the boundary portion is covered on the side surface and partially covered on the second opening; and the locking portion is adapted to pass through the second opening so as to be engaged with the clamped member.

15. The locking structure of claim 13, wherein the middle frame is provided with a first positioning portion, the clamped member is provided with a second positioning portion, the first positioning portion and the second positioning portion are adapted to mate with each other, to enable the clamped member to be positioned at the middle frame and have a movement degree of freedom in a predetermined direction; and wherein one of the first positioning portion and the second positioning portion comprises a guiding structure, the guiding structure is arranged along the predetermined direction; the other one of the first positioning portion and the second positioning portion comprises a sliding component, and the sliding component is slidably connected to the guiding structure.

16. The locking structure of claim 15, wherein a side of an abutting portion of the clamped member facing away from the second positioning portion is provided with a receiving groove; at an end of the abutting portion facing away from the pressing member, the receiving groove extends to an end surface of the abutting portion; and an end of a position-restoring member is accommodated in the receiving groove.

17. The locking structure of claim 13, wherein the second mounting portion comprises a holding hole provided in the middle frame, the clamped member is provided with a holding protrusion, the holding protrusion is movably accommodated in the holding hole, and a size of the holding protrusion in a predetermined direction is smaller than a size of the holding hole in the predetermined direction.

18. The locking structure of claim 1, wherein the locking structure further comprises a baffle detachably connected to the first structural body, the baffle is provided at the second mounting portion and adapted to shield at least part of the clamped member, and the baffle is provided with a through hole for mounting the locking portion.

19. A housing assembly, comprising:
a housing provided with a first mounting portion;
a middle frame provided with a second mounting portion; and
a key connected to the middle frame, wherein the key is configured to connect the middle frame and an external structure comprising a locking portion, and the key comprises:
a pressing member, wherein the pressing member is movably provided at the first mounting portion, and is configured to move relative to the first mounting portion in a first direction under an external force; and a clamped member, wherein the clamped member is movably provided at the second mounting portion, and positioned at the middle frame through the second mounting portion, and the clamped member is configured to be engaged with the locking portion of the external structure; at least partial structure of the clamped member is arranged opposite to the pressing member;

wherein in a process of mounting the external structure to the middle frame, the external structure is adapted to move in a second direction to push the clamped member to move relative to the middle frame in the first direction, and the clamped member is capable of being restored so as to be engaged with the locking portion of the external structure; in a process of detaching the external structure from the middle frame, the pressing member is capable of being pressed to drive the clamped member to move in the first direction so as to be disengaged from the external structure, wherein the first direction is different from the second direction.

20. An electronic device configured to be installed with a strap, the electronic device comprising:

a casing, provided with a first mounting portion and a second mounting portion communicated with each other;

a key comprising a pressing member and an elastic connection member, wherein the elastic connection member is connected to the pressing member, and the pressing member is provided at the first mounting portion; and a clamped member provided at the second mounting portion, wherein assembling and positioning of the clamped member to the casing are performed separately from assembling and positioning of the pressing member to the casing;

wherein the clamped member is adapted to mate with a locking portion of the strap, to make the strap confined at the casing; when the strap is confined at the casing, the elastic connection member abuts against the casing, to make the pressing member confined at the casing; the pressing member is adapted to, when being pressed, move relative to the casing and drive the clamped member to move, to enable the clamped member to be disengaged from the strap, and enable the strap to be detached from the casing.

* * * * *